(12) United States Patent
Yokoyama

(10) Patent No.: US 8,582,671 B2
(45) Date of Patent: Nov. 12, 2013

(54) MULTICARRIER COMMUNICATION APPARATUS

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1448 days.

(21) Appl. No.: 12/168,556

(22) Filed: Jul. 7, 2008

(65) Prior Publication Data

US 2008/0267312 A1 Oct. 30, 2008

Related U.S. Application Data

(63) Continuation of application No. PCT/JP2006/301534, filed on Jan. 31, 2006.

(51) Int. Cl.
*H04K 1/10* (2006.01)

(52) U.S. Cl.
USPC .......................................... 375/260; 375/295

(58) Field of Classification Search
USPC .......... 375/260, 295, 296; 370/206, 208, 236; 455/39, 122, 95; 342/378
See application file for complete search history.

(56) References Cited

U.S. PATENT DOCUMENTS

| | | | | |
|---|---|---|---|---|
| 6,611,231 | B2 * | 8/2003 | Crilly et al. | 342/378 |
| 6,665,831 | B1 | 12/2003 | Yoshida et al. | |
| 6,891,902 | B2 * | 5/2005 | Talwar et al. | 375/296 |
| 7,583,738 | B2 * | 9/2009 | Yun et al. | 375/260 |
| 2002/0105947 | A1 | 8/2002 | Kitagawa et al. | |
| 2005/0208906 | A1 | 9/2005 | Miyoshi et al. | |
| 2005/0249110 | A1 * | 11/2005 | Huo et al. | 370/208 |
| 2007/0155323 | A1 * | 7/2007 | Matsumoto et al. | 455/39 |

FOREIGN PATENT DOCUMENTS

| | | |
|---|---|---|
| EP | 0735731 | 2/1996 |
| EP | 1 198 088 | 4/2002 |
| EP | 1 489 767 | 12/2004 |
| EP | 1 533 926 | 5/2005 |
| JP | HEI 9-107345 | 4/1997 |
| JP | HEI 09-107345 | 4/1997 |
| JP | 2000-286818 | 10/2000 |
| JP | 2001-339361 | 12/2001 |
| JP | 2004-129249 | 4/2004 |
| JP | 2005-94672 | 4/2005 |
| JP | 2005-101975 | 4/2005 |

(Continued)

OTHER PUBLICATIONS

Seung Hee Han et al. ("An Overview of Peak-to-Average Power Ratio Reduction Techniques for Multicarrier Transmission", IEEE Wireless Communications, Apr. 2005).*

(Continued)

*Primary Examiner* — Daniel Washburn
*Assistant Examiner* — Fitwi Hailegiorgis
(74) *Attorney, Agent, or Firm* — Myers Wolin, LLC

(57) ABSTRACT

A multicarrier communication apparatus includes: a scheduler operable to schedule transmission opportunities of the plurality of series of transmission data in accordance with predetermined scheduling information; a peak evaluator to evaluate whether or not the peak of the multicarrier signal exceeds a predetermined threshold value; and a peak suppressing unit operable to halt transmission of at least some of the plurality of series of transmission data based on the scheduling information upon decision by said peak evaluator that the result of the evaluation exceeds the threshold value. This construction makes it possible to accomplish peak suppression with ease without increasing the arithmetic scale, like in the previous art, while maintaining communication of users high in scheduling precedence.

8 Claims, 18 Drawing Sheets

(56) References Cited

FOREIGN PATENT DOCUMENTS

| JP | 2005-167401 | 6/2005 |
|----|-------------|--------|
| JP | 2005-184435 | 7/2005 |
| JP | 2005-244958 | 9/2005 |

OTHER PUBLICATIONS

X. Li, et al., "Effects of Clipping and Filtering on the Performance of OFDM", IEEE Communications Letters, vol. 2, No. 5, May 1998.
R.W. Bauml, et al., "Reducing the Peak-to-Average Power Ratio of Multicarrier Modulation by Selected Mapping", Electronics Letters, vol. 32, No. 22.
N. Ohkubo, et al., "A Peak to Average Power Ratio Reduction of MC-CDMA Using Selected Mapping (SLM)", Technical Report of IEICE, CS2002-43 RCS2002-87, The Institute of Electronics, Information and Communication Engineers, Jun. 2002.
Japanese Patent Office "Notice of Ground of Rejection" for corresponding Japanese Patent Application No. 2007-556723, mailed Aug. 31, 2010. English Translation attached.
Japanese Patent Office "Notice of Ground of Rejection" issued for corresponding Japanese Patent Application No. 2007-556723, mailed Jan. 5, 2011. English translation attached.
Extended European Search Report issued for corresponding European Patent Application No. 06712677.1 dated Dec. 14, 2011.
X. Li, et al., "Effects of Clipping and Filtering on the Performance of OFDM", IEEE Communications Letters, vol. 2, No. 5, May, 1998.
A.E. Jones, et al., "Block Coding Scheme for Reduction of Peak to Mean Envelope Power Ratio of Multicarrier Transmission Schemes", Electronics Letters, vol. 30, No. 25, Dec. 8, 1994.
S.H. Muller, et al., "OFDM with Reduced Peak-to-Average Power Ratio by Optimum Combination of Partial Transmit Sequences", Electronics Letters, vol. 33, No. 5, Feb. 27, 1997.
R.W. Bauml, et al., "Reducing the Peak-to-Average Power Ratio of Multicarrier Modulation by Selected Mapping", Electronics Letters, vol. 32, No. 22. Oct. 24, 1996.
N. Ohkubo, et al., "A Peak to Average Power Ratio Reduction of MC-CDMA Using Selected Mapping (SLM)", Technical Report of IEICE, CS2002-43 RCS2002-87, The Institute of Electronics, Information and Communication Engineers, Jun., 2002.

\* cited by examiner

MULTICARRIER COMMUNICATION APPARATUS

This application is a continuation of International Application No. PCT/JP06/301534, filed Jan. 31, 2006, now pending, the contents of which are incorporated by reference.

TECHNICAL FIELD

The present invention relates to a multicarrier communication apparatus and a peak suppressing method for use in the same apparatus. For example, the present invention relates to technology for use in a system which transmits a multicarrier signal including more than one sub-carrier to which allocated are more than one series of transmission data.

BACKGROUND ART

Multicarrier transmission schemes such as OFDM (Orthogonal Frequency Division Multiplexing), that is, schemes in which a multicarrier signal, including more than one sub-carrier to which more than one series of transmission data is allocated, respectively, is transmitted, may cause an effect of non-linear distortion in an amplifier (power amplifier) since the larger the number of sub-carriers, the larger becomes a Peak to Average Power Ratio (PAPR).

For example, according to the OFDM scheme, a plurality of phase coherent state of sub-carriers at a certain moment causes amplitude combination, thereby bringing about a power peak. At that time, if the peak exceeds a linear region of amplitude amplification in inputting to an amplifier, a non-linear effect is generated, so that out-band radiation is caused.

Hence, in previous techniques, when there is a possibility of generation of an amplitude value of a level at which a linear characteristic cannot be assured, processing called "clipping" which cuts out unallowable bits is used for guaranteeing the linear characteristic region of an amplifier.

For example, as schematically shown in (1) of FIG. 18, in a transmitter (base station or the like) employing the OFDM modulation scheme, the state in which data of multiple users are input from a core network (remote center) to a base station is expressed by P/S conversion (conversion into time series data) executed by the parallel/serial (S/P) converter 101. From there, data of a requesting user (selected by a non-illustrated scheduler) is read out, and is S/P converted into parallel time domain signals of the number corresponding to the number of sub-carriers by the serial/parallel (S/P) converter 102, and is then subjected to IFFT processing to convert the time domain signals into frequency domain signals for mapping the user data to each sub-carrier, which is then P/S converted (time-division multiplexed) by the P/S converter 104 before being output.

Here, when the signal after being subjected to the IFFT processing is restored into a time-domain signal by the P/S converter 104, a case can occur where an amplitude value of a level at which a linear characteristic cannot be assured is generated as shown in (2) of FIG. 18. Thus, as shown in (2) and (3) of FIG. 18, clipping processing which cuts out unallowable bits is performed to assure the linear characteristic region of the amplifier.

In this instance, as such a technique relating to peak suppression, other techniques are under study such as making contrivances in coding (coding is executed in such a manner that a PAPR is suppressed at signal points at which data is mapped to a sub-carrier, which technique is equivalent to performing mapping for suppressing the peak of a certain sub-carrier), PTS (Partial Transmit Sequence) transmission, and SLM (Selected Mapping) transmission.

The PTS transmission is a technique for suppressing the PAPR by means of appropriately performing phase rotation processing for each chunk of a sub-carrier block. Here, this technique requires a resource for notifying the rotated phase amount.

The SLM transmission is a technique in which multiple arithmetic operation circuits of the number corresponding to the number of sub-carriers are provided, and different random codes are multiplied on the time axis in different arithmetic operation circuits to select the most effective series for suppressing the PAPR. Here, this technique also requires a resource for notifying the selected series.

Further, as PAPR suppressing techniques, there also are techniques proposed in the following patent documents 1 through 3.

The technique described in the following patent document 1 has an object of suppressing peak power while suppressing deterioration of the transmission efficiency in multicarrier transmission. In order to accomplish the object, the peak power of a generated OFDM signal is detected, and upon detection of the peak power exceeding a threshold value, a signal for suppressing a peak power (for example, a signal of either one or both of whose amplitude and phase are limited therein) is inserted, in place of transmission data (information signal), into a specific carrier, out of multiple carriers, or an information signal of a specific carrier is punctured (removed).

The technique described in the following patent document 2 has objects of improving the transmission efficiency by means of providing different transmission quality for different items of transmission data in multicarrier transmission and further of suppressing peak power in multicarrier transmission. In order to accomplish the objects, there provided is an ability of recognizing code words formed by the n-number of signal points for 1-multicarrier symbol time, that is, it is possible to perform efficient transmission by means of performing coding different in the minimum code distance and sequentially changing the minimum code distance, thereby providing different transmission quality in one data frame. In addition, the above coding employs a peak power suppressing code as a code used in transmission, thereby making it possible to suppressing the peak power while providing different transmission quality.

The technique described in the following patent document 3 has an object of lowering a transmission peak power to average power ratio without deteriorating the transmission efficiency significantly. In order to accomplish the object, upon detection of a peak of an amplitude level not smaller than a threshold value, the peak cutting unit suppresses the detected peak down to the threshold value (that is, the already described clipping processing). After FFT processing to the signal whose peak suppressing has been performed, input data to be allocated to sub-carriers of fast transmission rates is substituted with a signal before being subjected to clipping processing for the purpose of protecting the input data from non-linear distortion due to clipping processing. As to this clipping, a case in which puncturing is performed is also considered.

Patent Document 1: Japanese Patent Application Publication No. 2001-339361

Patent Document 2: Japanese Patent Application Publication No. 2000-286818

Patent Document 3: Japanese Patent Application Publication No. 2005-101975

DISCLOSURE OF THE INVENTION

Issue(s) to be Solved by the Invention

However, the above clipping processing (including the technique described in the above patent document 3) is a very simply scheme. Thus, although a degree of peak suppressing effect can be obtained, a region non-continuous in time is generated in a sub-carrier as schematically shown in (4) and (5) of FIG. 18, so that generation of out-band radiation cannot be avoided and the orthogonal relationship between sub-carriers is lost, characteristic deterioration thereby being caused. In contrast to this, the use of the already described technique in which contrivances are made in coding (including the technique described in the above patent document 2), the PTS transmission, and the SLM transmission, brings about better characteristics than those which can be obtained by clipping processing, but a large load is caused in the arithmetic operation scale.

Further, as described in the above patent document 1, in the technique of puncturing a part of an information signal and inserting a peak suppressing signal thereinto, a bit error is caused in the punctured part, so that strong error correction processing is required for preventing lowering of the reception error rate. Furthermore, although the above patent document 1 discloses a method for halting transmission of an information signal by the sub-carriers selected from all the sub-carriers for peak suppression, the selection criteria and treatment of the sub-carriers, transmission of whose information signal is halted, thereafter is unclear.

The present invention is originated in view of the above described issues to be solved. One object of the present invention is making it possible to suppress a PAPR with ease in a case where an unallowable peak (PAPR) occurs, by means of halting (puncturing) transmission of information signals to users of at least some of the carries in accordance with a predetermined priority, without impacting a reception error rate (without requiring strong error correction processing). Further, another object of the present invention is making it possible to maintain the equality of transmission opportunities by means of clarifying the treatment of the carries (users) whose transmission has been halted for PAPR suppression.

Means to Solve the Issue(s)

In order to accomplish the above objects, the present invention provides the following multicarrier communication apparatus and the following peak suppression method for used in the same apparatus are used.

(1) As a generic aspect, there provided is a multicarrier communication apparatus which transmits a multicarrier signal including a plurality of carriers to which a plurality of series of transmission data are allocated, the apparatus comprising: a scheduling means operable to schedule transmission opportunities of the plurality of series of transmission data in accordance with a predetermined scheduling information; a peak evaluating means to evaluate whether or not the peak of the multicarrier signal exceeds a predetermined threshold value; and a peak suppressing means operable to halt transmission of at least some of the plurality of series of transmission data based on the scheduling information upon decision by the peak evaluating means that the result of the evaluation exceeds the threshold value.

(2) As a preferred aspect, the peak suppressing means is operable to perform the halt processing repeatedly to the plurality of series of transmission data in order of increasing precedence, based on precedence order information as element information of the scheduling information, until the peak evaluating means decides that the peak does not exceed the threshold value.

(3) As another preferred aspect, the peak suppressing means is operable to perform the halt processing repeatedly to the plurality of series of transmission data in order of increasing of the width of the frequency band used for the individual series of the transmission data, based on frequency band information in use as element information of the scheduling information, until the peak evaluating means decides that the peak does not exceed the threshold value.

(4) As yet another preferred aspect, the multicarrier communication apparatus may further comprise: a notifying means operable to notify an apparatus which receives the multicarrier signal of information identifying transmission data having been subjected to the halt processing.

(5) As still another preferred aspect, the multicarrier communication apparatus may further comprise: a peak suppressing data inserting means operable to insert peak suppressing data in place of the transmission data having been subjected to the halt processing.

(6) As a further preferred aspect, the scheduling means may include a means operable to update the scheduling information in order to set the transmission data having been subjected to the halt processing in such a manner that the transmission data is to be preferentially transmitted at the next transmission opportunity.

(7) As another generic aspect, there provided is a multicarrier communication apparatus which transmits a multicarrier signal including a plurality of carriers to which a plurality of series of transmission data are allocated, the apparatus comprising: a scheduling means operable to schedule transmission opportunities of the plurality of series of transmission data in accordance with a predetermined scheduling information; a multicarrier signal generating means operable to generate the multicarrier signal and one or more multicarrier signals, from which at least some of the plurality of series of transmission data have been removed beforehand based on the scheduling information; a peak evaluating means to evaluate whether or not the peak of each of the multicarrier signals generated by the multicarrier signal generating means exceeds a predetermined threshold value; and a selecting means to select a multicarrier signal whose peak is decided not to exceed the threshold value by the peak evaluating means as a subject to be transmitted.

(8) As a preferred aspect, the multicarrier signal generating means may generate the one or more multicarrier signals, in which transmission data has been removed beforehand out of the series of the transmission data lower than the others in priority, based on priority order information as element information of the scheduling information.

(9) As another preferred aspect, the multicarrier signal generating means may generate the one or more multicarrier signals, in which transmission data has been removed beforehand out of the series of the transmission data whose frequency band is narrower than the others, based on frequency band information in use as element information of the scheduling information.

(10) As yet another preferred aspect, the multicarrier communication apparatus may further comprise: a peak suppressing data inserting means operable to insert peak suppression data in place of the transmission data which has been removed beforehand.

(11) As a further preferred aspect, the multicarrier communication apparatus may further comprise: a notifying means operable to notify an apparatus which receives the multicarrier signal of information relating to a multicarrier signal selected by said selecting means.

(12) As a still further preferred aspect, the scheduling means may include a means operable to update the scheduling information in order to set the transmission data which has been removed beforehand from element data of a multicarrier signal selected by the selecting means in such a manner that the transmission data is to be preferentially transmitted at the next transmission opportunity.

(13) As yet another generic aspect, there provided is a peak suppressing method for use in a multicarrier communication apparatus, the method comprising: evaluating whether or not the peak of the multicarrier signal exceeds a predetermined threshold value; and halting transmission of at least some of the plurality of series of transmission data based on the scheduling information, which schedules transmission opportunities of the plurality of series of transmission data, upon decision in the evaluation that the result of the evaluation exceeds the threshold value.

(14) As still another generic aspect, there provided is a peak suppressing method for use in a multicarrier communication apparatus, the method comprising: generating the multicarrier signal and one or more multicarrier signals, from which at least some of the plurality of series of transmission data have been removed beforehand based on the scheduling information that schedules transmission opportunities of the plurality of series of transmission data; evaluating whether or not the peak of each of the generated multicarrier signals exceeds a predetermined threshold value; and selecting a multicarrier signal whose peak is decided not to exceed the threshold value as a subject to be transmitted.

Effects of the Invention

According to the above-described technique, at least any one of the following effects and benefits are realized.

(1) Since transmission halting processing is performed, upon occurrence of an unallowable (exceeding the threshold) peak in a multicarrier signal to be transmitted, to at least apart of the multiple series of transmission data (for example, transmission halting processing is sequentially performed in increasing order of precedence in the scheduling means or in increasing order of the width of the frequency band in use), it is possible to accomplish peak suppressing with ease without increasing the arithmetic operation scale, which is an issue in the previous art, while maintaining, for example, communication of users high in schedule precedence.

(2) Further, since peak suppressing is controlled depending upon the presence or the absence of transmission data of each user (receiver), effects on bit errors and packet errors are not caused.

(3) Still further, since the transmission data whose transmission has been temporarily halted for peak suppression is notified to the receiver end, useless operations of demodulation processing and decoding processing circuits can be eliminated. This significantly contributes to lowering of power consumption on the receiver end.

(4) Furthermore, since a multicarrier signal from which at least a part of transmission data has been removed is generated beforehand in accordance with the above mentioned precedence (or the frequency band in use) and then a multicarrier signal whose peak becomes not larger than the threshold is selected as an object to be transmitted, it is possible to eliminate the necessity for regenerating a transmission multicarrier signal once again after peak evaluation performed, so that performance deterioration due to latency can be prevented.

DESCRIPTION OF REFERENCE CHARACTERS

Figure 1:
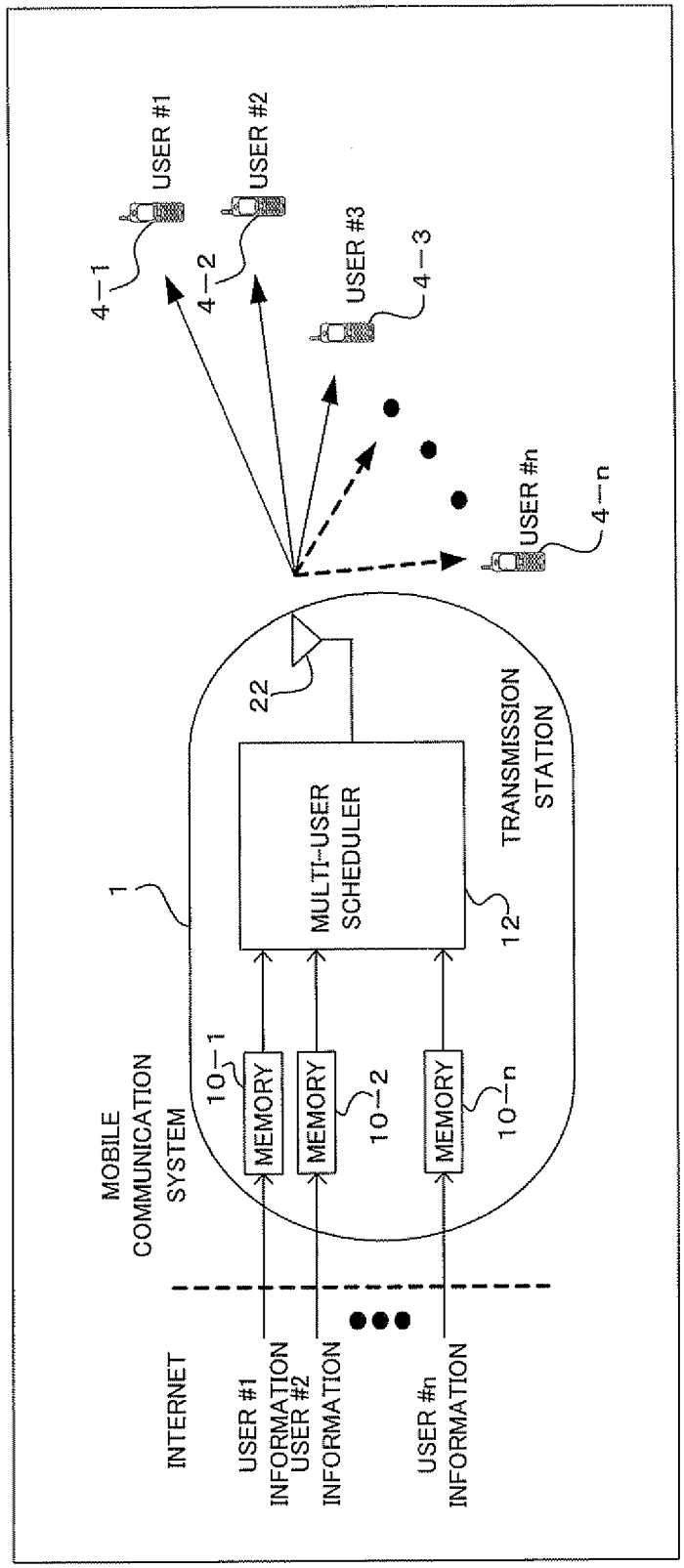
FIG. 1 is a block diagram illustrating an example of a multicarrier transmission system for describing an overview.

1 . . . transmitter (multicarrier communication apparatus)
10-1 through 10-n . . . memory (memory area)
11, 17, 17a, and 20 . . . parallel/serial (P/S) converter
12 . . . multi-user scheduler (scheduling means)
13a and 13b . . . serial/parallel (S/P) converter
13c . . . fast Fourier transformer (FFT)

13d . . . cutting unit
14 and 14-1 through 14-k . . . coder
15, 15-1 through 15-k, 25, and 28 . . . modulator
16, 16a, 26, and 29 . . . inverse fast Fourier transformer (IFFT)
18, 18-1 through 18-M . . . peak evaluator
19 . . . switch
21 . . . transmission RF unit
22 . . . transmitter antenna
23 . . . priority allocating/AMC setting unit
24 . . . scheduler management information generator receiver antenna
31 . . . reception RF unit
32 . . . demodulator
33 . . . feedback information evaluator
34A, 34B, 212A, and 212B . . . mixer (multiplier)
35 and 213 . . . adder (multiplexing circuit)
36-1 through 36-M . . . transmission signal generator
37 . . . optimal generation scheme evaluator
38 . . . generation scheme notifying unit
39 . . . peak suppression signal generator (peak suppression data inserting means)
211A and 211B . . . digital/analogue (D/A) converter
214 . . . amplifier
215 . . . local oscillator
216 . . . π/2 phase shifter
4 . . . receiver
41 . . . receiver antenna
42 . . . reception RF unit
43 . . . serial/parallel (S/P) converter (channel separator)
44, 49, and 54 . . . fast Fourier transformer (FFT)
45 . . . propagation path estimator
46 . . . SINR calculator
47 . . . CQI converter
48 and 60 . . . feedback information converter
50 and 55-1 through 55-k . . . demodulator
51 . . . scheduler management information evaluator
52 . . . demodulation evaluator
53 . . . serial/parallel (S/P) converter
56-1 through 56-k . . . decoder
57 . . . frequency aligner
58 . . . retransmission evaluator
59 . . . switch
61 . . . feedback information multiplexer
62 . . . modulator
63 . . . transmission RF unit
64 . . . transmitter antenna

BEST MODE FOR CARRYING OUT THE INVENTION

Embodiments will now be described with reference to the relevant accompanying drawings.

[A] Description of Overview

The embodiments may be applicable to systems in which transmission stations employing a multicarrier transmission scheme such as the OFDMA (Orthogonal Frequency Division Multiple Access) schedules more than one user for performing transmission. As an example of such a system, in a case of a mobile telephone system, downlink, transmission from a base station to more than one user, is assumed.

First of all, an outline of the embodiments will be given with reference to FIG. 1 and FIG. 2.

Figure 2:
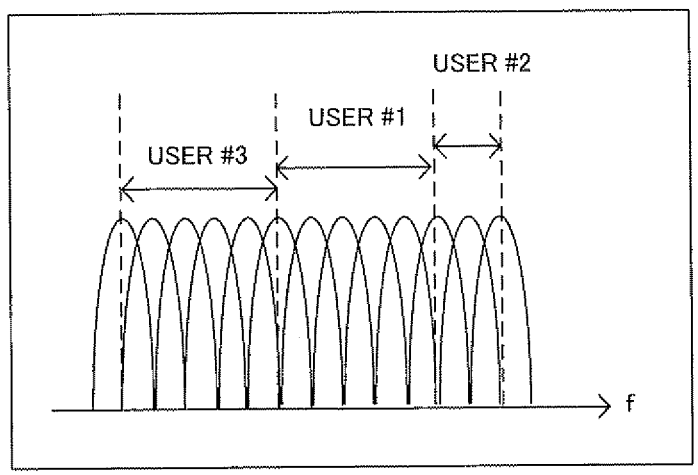
FIG. 2 is a diagram illustrating an image of frequency allocation performed in the transmission station shown in FIG. 1.

As shown in FIG. 1, each of the mobile terminal devices (receivers) 4-1 through 4-n (n is an integer equal to or larger than 2) of multiple users #1 through #n communicating with a certain transmission station (transmitter) 1, collects various kinds of useful information from the Internet network or the like. The collected information is temporarily buffered in the memories (or memory areas) 10-1 through 10-n of the transmitter 1 corresponding to the users #1 through #n. Then, in response to a transmission request from a multi-user scheduler 12, data is read from a memory 10-i (i=1 through n) to the multiple user scheduler (hereinafter will be also simply called the "scheduler") 12 to be allocated to a sub-carrier of OFDMA, and is then transmitted to the receiver 4-i of a desired user #i through wave propagation. In this instance, in the following description, when the mobile terminal devices (receivers) 4-1~4-n are not distinguished thereamong, the device will be referred to as a mobile terminal device (receiver) 4 or a terminal 4.

Here, since the frequency band which can be spatially radiated is regulated, it is impossible to transmit information of all the users #i at the same time. Thus, at a certain moment, information is transmitted only to a part of the users #i (users #1, #2, and #3) which are indicated by the solid arrows in FIG. 1. This user allocation on the frequency domain at a moment is shown in FIG. 2.

Next, a description will be made of an overview of a distinctive part of the embodiments with reference to FIG. 3.

Figure 3:
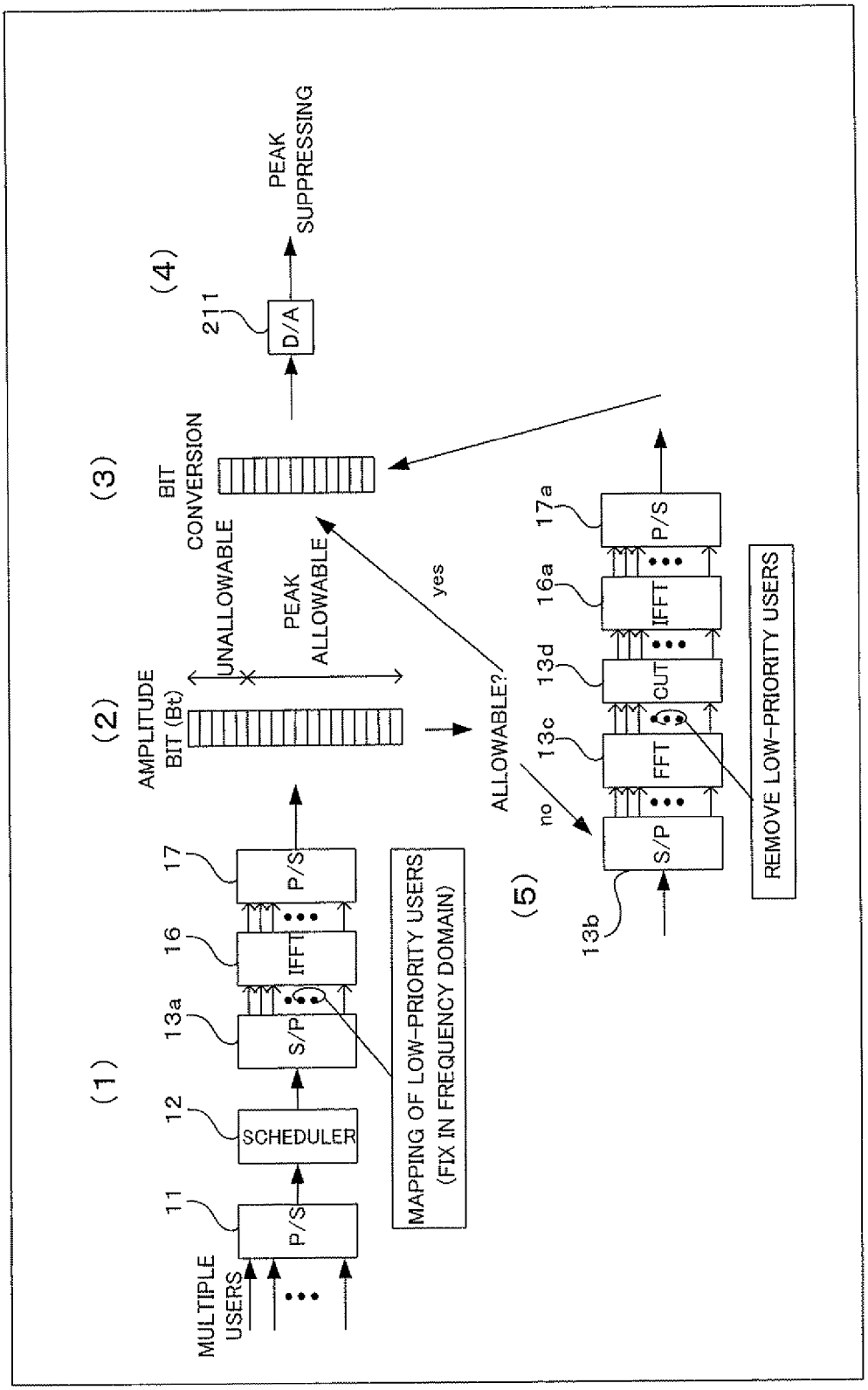
FIG. 3 is a schematic diagram for describing an operation overview.

As shown in (1) of FIG. 3, data streams destined to multiple users #i are P/S converted (time-division multiplexed) by a parallel/serial (P/S) converter 11. Hereby, only data streams of the users #i selected by the scheduler 12 are brought into a state of readiness to be transmitted, and the scheduler 12 begins to get in preparation of transmission in accordance with the communicable information amount and the sub-carrier region to which mapping is performed which are notified at the same time.

(1) of FIG. 3 illustrates a state in which mapping is performed in pursuance of the notification given at the time of S/P conversion. The information mapped to the frequency domain is S/P converted by the serial/parallel (S/P) converter 13a, and is then subjected to IFFT processing performed by the IFFT 16, thereby being converted into a time domain signal which has a certain amplitude and phase, and further is P/S converted (time-division multiplexed) by the parallel/serial (P/S) converter 17. Since the signal is a digital signal in this case, it is possible for the signal to be alternately expressed as a signal having amplitudes on the I axis and the Q axis (orthogonal multiplex signal). The amplitude bits illustrated in (2) of FIG. 3 indicate the level of amplitude values on the I axis and the Q axis.

Here, the amplitude values on the I axis and the Q axis are monitored. If the result falls within an allowable range, surplus bits are removed, and then the signal is D/A converted by the digital/analogue (D/A) converter 211, as shown in (3) and (4) of FIG. 3.

Each item of data on the I axis and the Q axis after being D/A converted is subjected to orthogonal modulation before being radiated through the transmitter antenna 22. In this instance, as another evaluating means, for example, monitoring the amplitude value $(I^2+Q^2)^{1/2}$ obtained after combination with respect to the I axis and the Q axis and evaluating whether or not the obtained result falls within an allowable range, further improve accuracy.

On the other hand, if the amplitude evaluation result is unallowable, the signal is converted into a frequency domain signal once again by the S/P converter 13b and the FFT 13c, as shown in (5) of FIG. 3. Then, after the cutting unit 13d removes (punctures) data of user #i the lowest in priority in accordance with the priority order (determined on, for example, charges, services to be provided, current propagation circumstances, etc.) ranked beforehand in the scheduler 12, the signal is reconverted into a time domain signal by the IFFT 16a and the P/S converter 17a, and amplitude value evaluation is performed once again.

If the evaluation result is still unallowable, processing similar to the above is performed, and data of user #i (sub-carrier) nextly low in priority is punctured, and similar data puncture is repeated in the increasing order of precedence of user #i until the amplitude evaluation condition is satisfied. In this instance, it is also possible to insert a control signal for suppressing a PAPR into the removed sub-carrier region.

In this manner, in cases where an amplitude value of a level appears on which the linear characteristic of an amplifier cannot be assured when a reception signal is converted into a time domain signal after being subjected to IFFT processing, FFT processing is performed, and removal of data in a part of the whole sub-carriers (sub-carriers of users low in priority) or in all the sub-carriers in the frequency domain is performed in increasing order of precedence until the PAPR becomes allowable. This makes it possible to suppress the PAPR.

Hereinbelow, a concrete example will be described.

[B] First Embodiment

Figure 4:
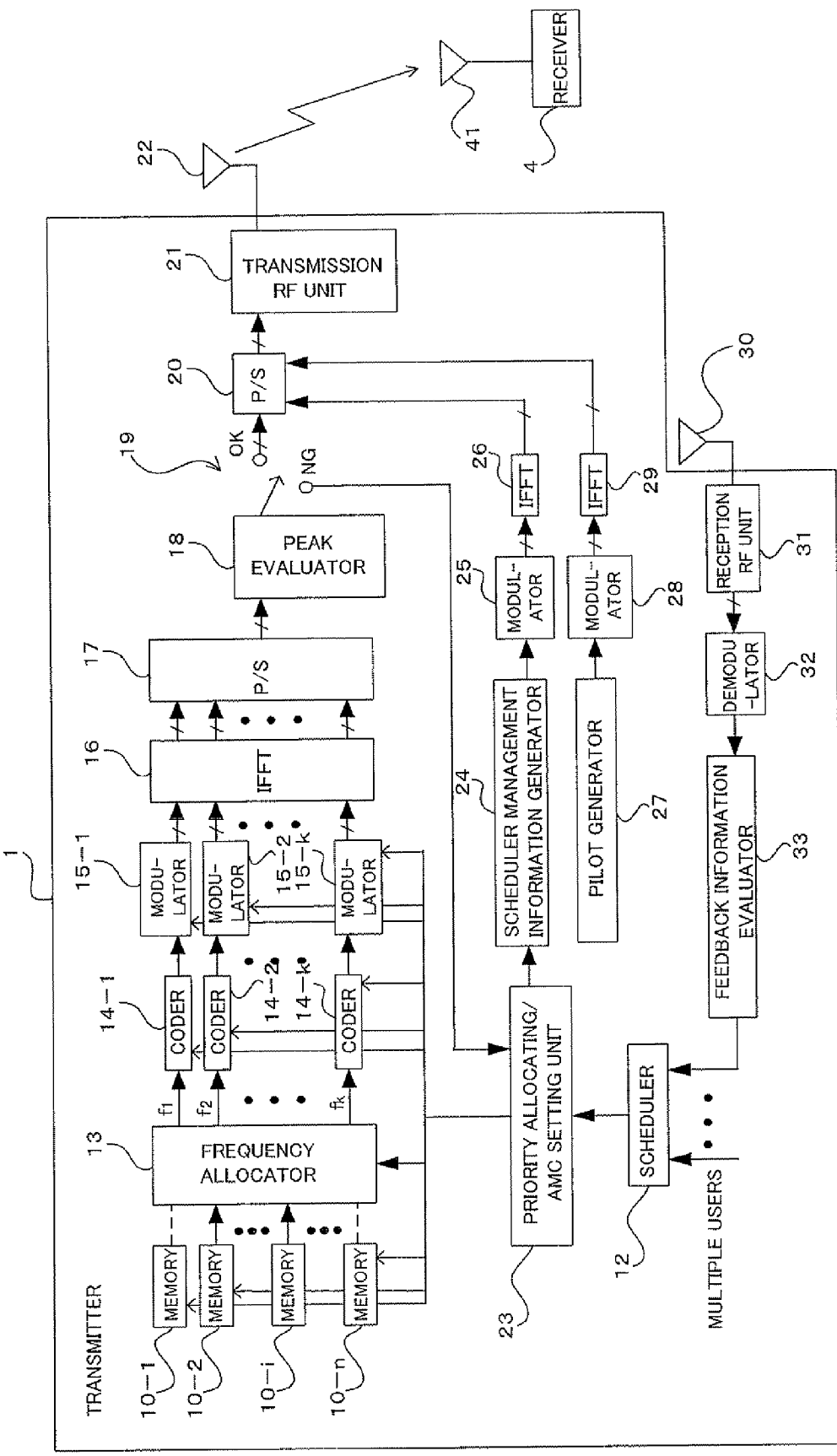
FIG. 4 is a diagram illustrating a construction of a multicarrier (OFDM) transmission system according to a first embodiment with a focus on a transmitter (multicarrier communication apparatus)
Figure 5:
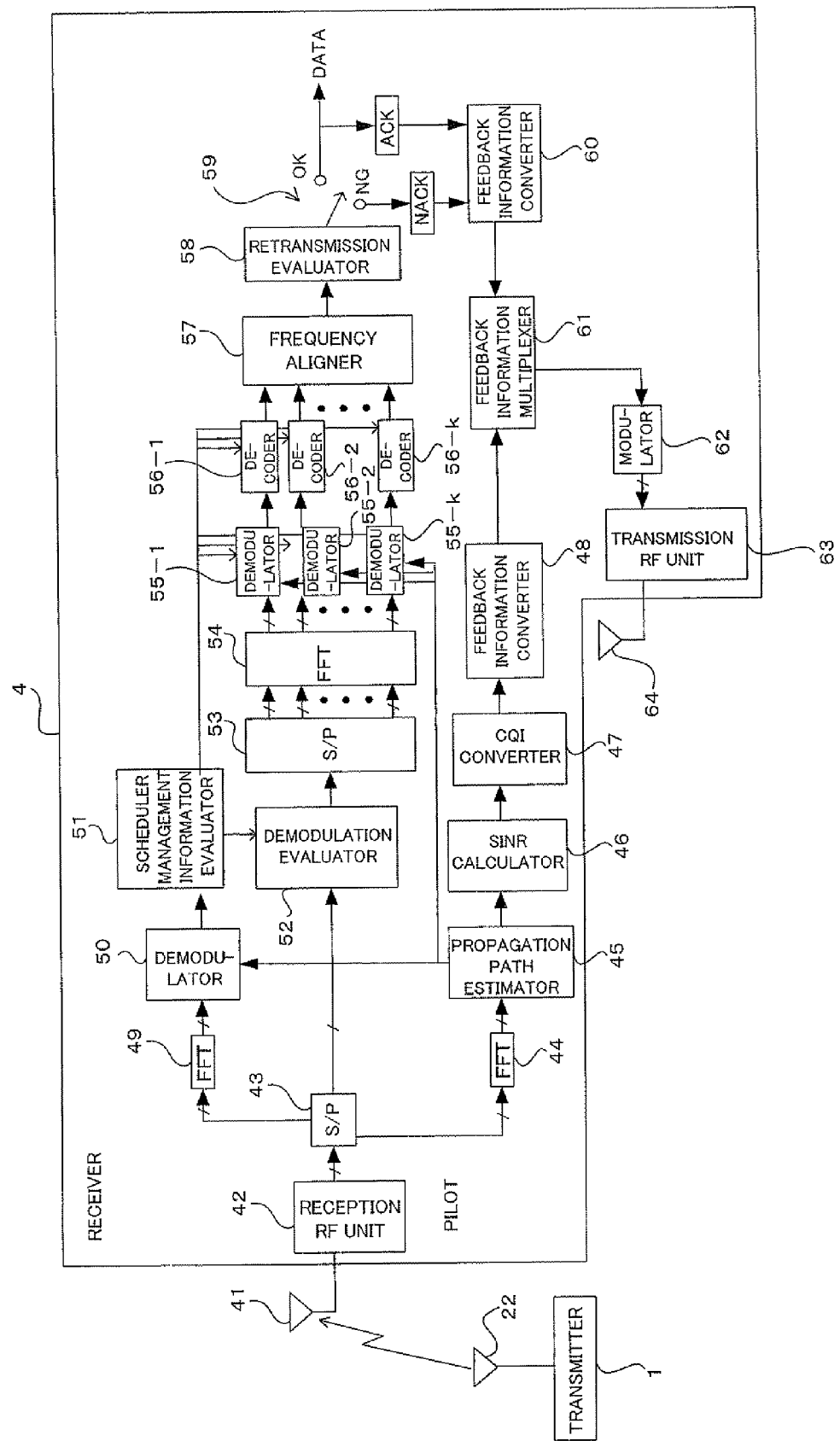
FIG. 5 is a diagram illustrating a construction of a multicarrier (OFDM) transmission system according to a first embodiment with a focus on a receiver.

FIG. 4 is a block diagram illustrating a construction of a multicarrier (OFDM) transmission system according to a first embodiment with a focus on a transmitter (multicarrier communication apparatus); FIG. 5 is a diagram illustrating a construction of a multicarrier (OFDM) transmission system according to the first embodiment of the present invention with an attention paid to a receiver. For example, the transmitter 1 shown in FIG. 4 is applicable to base station apparatuses, and the receiver 4 shown in FIG. 5 is applicable to mobile terminal apparatuses. In this instance, hereinafter, the transmitter 1 will be also called the base station 1, and the receiver 4 will be also called the terminal 4. Further, the number of sub-carriers is assumed to be k (k is an integer equal to or larger than 2). Further, in FIG. 4, the wiring added with "/" indicates that an orthogonal multiplexed I-Q signal on a complex plane is transmitted.

As shown in FIG. 4, with a focus on its important part, the transmitter 1 according to the present embodiment includes, for example: the memories (or memory areas) 10-1 through 10n corresponding to the more than one users #1 through #n (terminals 4-1 through 4-n), respectively; a scheduler 12; a frequency allocator 13; coders 14-1 through 14-k; modulators 15-1 through 15-k; an IFFT 16; a P/S converter 17; a peak evaluator 18; a switch 19; a P/S converter 20; a transmission RF unit 21; a transmitter antenna 22; a priority allocating/AMC setting unit 23; a scheduler management information generator 24; a modulator 25; an IFFT 26; a pilot generator 27; a modulator 28; an IFFT 29; a receiver antenna 30; a reception RF unit 31; a demodulator 32; and a feedback information evaluator 33.

Here, each memory 10-$j$ (j=1 through n) holds a signal to be sent (a user data stream; hereinafter may be also called transmission user data).

The scheduler (scheduling means) 12 adaptively specifies (schedules) allocation of a transmission opportunity (timing) and a frequency (sub-carrier) to each user (data stream), coding, and modulation (AMC: Adaptive Modulation and Coding), based on information relating to all the users (terminals 4) [for example, the necessity or the unnecessity of retransmission information can be acknowledged from ACK/NACK information, which is fedback from the terminals 4, and information of downlink propagation paths can be obtained from CQI (Channel Quality Indicator) information]. In the present embodiment, the scheduler 12 is also capable of determining the precedence with which transmission opportunities are practically allocated based on the types (real time communication such as telephone and games, non-real time communication such as the Internet communication and download of files), decision of the charging classes of clients, the amount of information accumulated in the memory 10-$j$, an average throughput, and whether or not object transmission information is retransmission information.

The frequency allocator 13 allocates (maps) more than one series of transmission user data read from the memory 10-$j$ to predetermined frequencies (sub-carries) fx (x=1 through k) in accordance to control (setting) from the priority allocating/AMC setting unit 23.

The coder 14-$x$ codes transmission user data (that is, sub-carrier data) with the coding scheme and the coding rate set by the priority allocating/AMC setting unit 23. In this instance, the "coding" is a concept which includes performing coding in such a manner that a PAPR can be suppressed at signal points which are mapped to sub-carries, that is, removing (puncturing) transmission user data of a certain sub-carrier and mapping a signal suppressing a peak (PAPR).

The modulator 15-$x$ modulates transmission user data after being subjected to the above coding with a modulation scheme set by the priority allocating/AMC setting unit 23. As modulated data, an orthogonal multiplex signal of an I signal and a Q signal is obtained.

The IFFT 16 performs IFFT processing to the above modulation data, which is an orthogonal multiplex signal for each sub-carrier, to convert the modulation data into a time domain orthogonal multiplex signal. The P/S converter 17 P/S converts the time domain signal obtained by the above IFFT processing and outputs a signal of a predetermined channel (transport channel) format.

The peak evaluator (peak evaluating means) 18 performs peak evaluation of a transport channel to decide the presence or the absence of generation of an unallowable PAPR. In a case where an unallowable PAPR is not generated, the switch 19 is switched to the P/S converter 20 side, and the transport channel is subjected to channel orthogonal multiplexing with a pilot channel and a scheduler managing channel. In this instance, the "channel orthogonal multiplexing" includes all the schemes of "orthogonal multiplexing", not only the above time-division multiplexing but also frequency-division multiplexing, code-division multiplexing, or the like. That is, all the channels are not subjected to time-division multiplexing by P/S conversion, and frequency-division multiplexing in which a specific sub-carrier is allocated to each channel, code-division multiplexing in which an orthogonal code is multiplied for each channel, and combinations of these are applicable.

On the other hand, in a case where it is decided that an unallowable PAPR is generated, the switch 19 is switched to the priority allocating/AMC setting unit 23 side, so that a transport channel is not output to the P/S converter 20, and to the effect of peak evaluation abnormality is output to the priority allocating/AMC setting unit 23.

Here, as already described, the above peak evaluation can be performed by monitoring the amplitude values on the I axis and the Q axis, respectively, and evaluating whether or not the monitoring result falls within an allowable range (not larger than a predetermined threshold value). Further, it can be performed by monitoring an amplitude value $(I^2+Q^2)^{1/2}$ after combination with respect to the I axis and the Q axis and evaluating whether or not the monitoring result falls within an allowable range (not larger than a predetermined threshold value).

Figure 6:
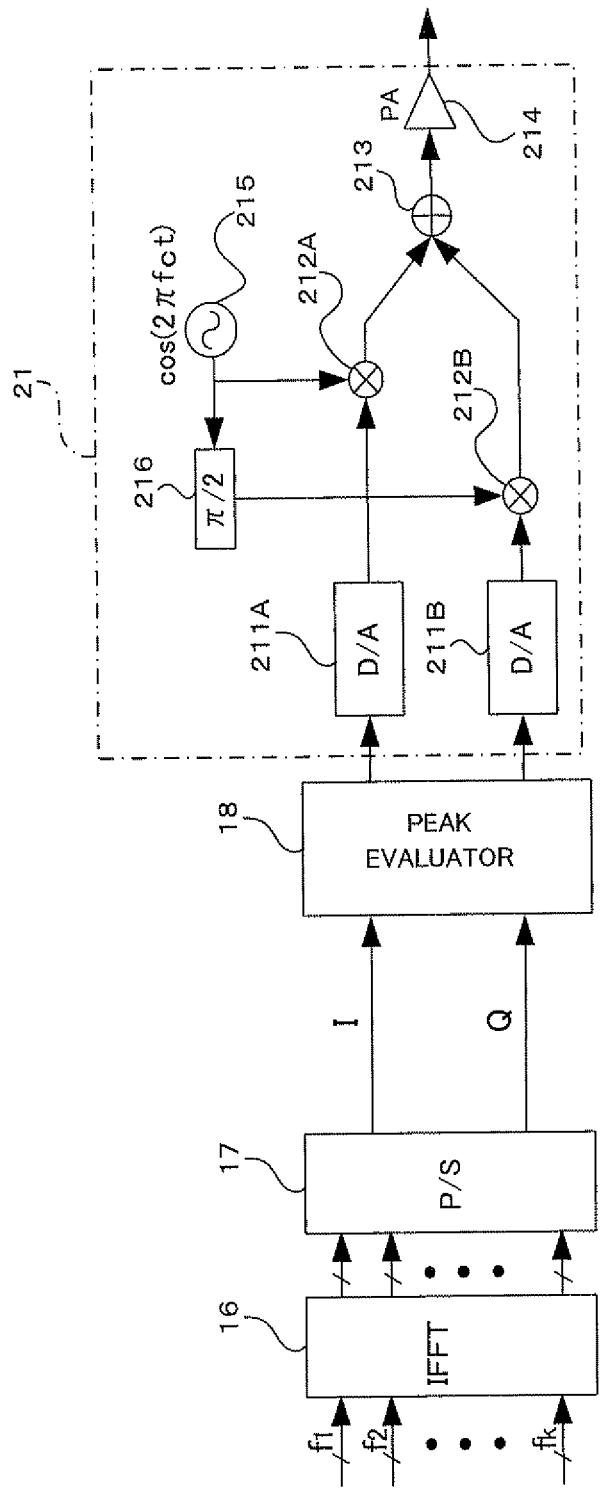
FIG. 6 is a block diagram illustrating a construction with a focus on a modulating means of the transmitter for describing the peak evaluating method corresponding to a modulating method used in the transmitter shown in FIG. 4.

As an example of the former, FIG. 6 illustrates a construction in which the I signal and the Q signal are D/A converted by the digital/analogue (D/A) converters 211A and 211B, respectively, and are modulated in phase by mapping the I signal and the Q signal on an orthogonal phase plane when up-conversion is performed by the mixers (multipliers) 212A and 212B in an analogue part that multiply frequency signals, in which phases obtained by the local oscillator 215 and the π/2 phase shifter 216 differ from each other by π/2. With this construction, it is possible to perform peak evaluation by using the amplitude values of I and Q. In this instance, in FIG. 6, the reference character 213 indicates an adder (multiplexing circuit) which adds (multiplexes) the I signal and the Q signal; the reference character 214 indicates an amplifier which amplifies a channel orthogonal multiplex signal, which is a transmission signal, up to a required transmission power.

Figure 7:
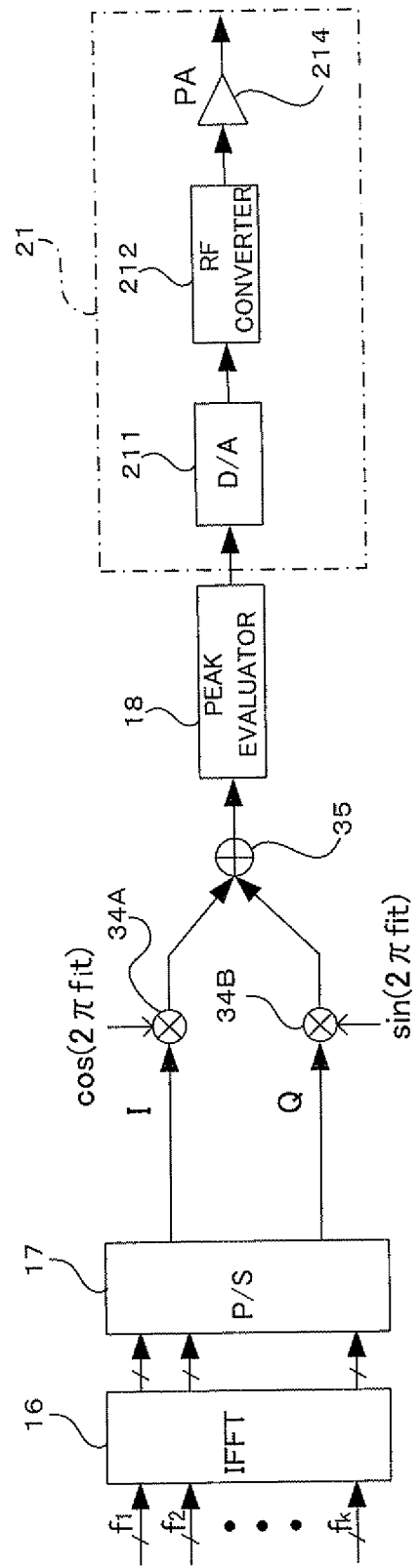
FIG. 7 is a block diagram illustrating an construction with a focus on a modulating means of the transmitter for describing another peak evaluating method in accordance with a modulating method used in the transmitter shown in FIG. 4.

As an example of the latter, FIG. 7 illustrates a case in which peak evaluation is performed when the digital part performs fast sampling of each of the I signal and the Q signal, which is obtained by the IFFT 16 and the P/S converter 17, by the mixers 34A and 34B and the adder 35 and the signals are up-converted to an intermediate frequency (IF) band. In this case, one item of information, the amplitude information $(I^2+Q^2)^{1/2}$, which is obtained by combining I and Q is required for peak evaluation, and thus, one D/A converter (D/A converter 211) may be required. In this instance, in FIG. 7, a signal of $(I^2+Q^2)^{1/2}$ is directly input to the peak evaluator 18. Further, in this FIG. 7, the reference character 212 indicates an RF converter which performs an RF-band frequency conversion (up-conversion) of an analogue channel orthogonal multiplex signal in the IF band from the D/A converter 211; the reference character 214 indicates, in this case also, an amplifier which amplifies a channel orthogonal multiplex signal in the RF band up to a required transmission power. Further, in FIG. 6 and FIG. 7, a useful filter, etc., are omitted from illustration thereof.

Next, in FIG. 4, the priority allocating/AMC setting unit 23 controls reading of a user data stream from the memory 10-j to the frequency allocator 13, frequency allocation in the frequency allocator 13, AMC, that is, the coding scheme used in the coder 14-x, a coding rate, and the modulation scheme used in the modulator 15-j (for example, QPSK, 16QAM, or the like), in accordance with the precedence and AMC setting determined by the scheduler 12. In this case, as described above, since the frequency band which can be used to spatial transmitting is limited, it is impossible to perform information transmission to all the receivers 4 at the same time. At a certain moment, it is possible to transmit information to a part of the receivers 4 (the solid arrow from the memory 10-j to the frequency allocator 13 in FIG. 4 indicates such a state. The same goes for in the following).

Here, the priority allocating/AMC setting unit 23 of the present example has a function as a peak (PAPR) suppressing means, that is, a function of controlling the corresponding coder 14-x and modulator 15-x in order to repeat transmission halting processing of data streams to at least some of the above multiple series of transmission user data based on the scheduling information of the scheduler 12, more concretely, the priority (priority order) information when the result of the peak evaluation by the peak evaluator 18 is "NG". In more details, the data stream halting processing is repeated in increasing order of the priority of user until the peak evaluation result becomes OK (not larger than the threshold).

In this instance, the "transmission halting processing" includes removing data (in other words, performing puncture making the amplitude value "0") as well as processing of reducing (changing) the number of sub-carriers.

The P/S converter 20 performs channel orthogonal multiplexing of each time domain signal (notification information and a pilot signal to the receiver 4) sent from the IFFTs 26 and 29 to a transport channel which is input via the switch 19 when the above peak evaluation result has no problem. The transmission RF unit 21 performs wireless transmission processing such as frequency conversion (up-conversion) of the multiplexed signal into a signal in the radio frequency (RF) band and amplifies the signal up to a required transmission power. The transmitter antenna 22 radiates the transmission signal in the RF band to a propagation path to the receiver 4.

The scheduler management information generator 24 generates information relating to a state of allocation of users specified by the scheduler 12 (priority allocating/AMC setting unit 23), its coding, and a modulation scheme, as scheduler management information. The modulator 25 modulates this generated management information in compliance with a channel (scheduler management channel) format having been determined beforehand. The IFFT 26 performs IFFT processing to the modulation data (I, Q signal) obtained by the above modulation to convert the data into a time domain signal. This obtained signal is orthogonal multiplexed to a transport channel of transmission user data by the P/S converter 20 as described above.

That is, a block including these scheduler management information generator 24, the modulator 25, and the IFFT 26 functions as a notifying means which notifies the receiver 4 of information relating to the user allocation state through a scheduler management channel as information identifying a transmission signal to which transmission halting processing has been performed.

The pilot generator 27 generates a pilot signal (signal already known between the transmitter 1 and the receiver 4) to be sent by the receiver 4 for obtaining path timing and propagation path information in a signal pattern of a format having been determined beforehand. The modulator 28 modulates the pilot signal in agreement with a channel (pilot channel) form at having been determined beforehand. The IFFT 29 performs IFFT processing to the modulation data (I, Q signal) obtained by the above modulation to convert the data into a time domain signal. This obtained signal is orthogonal multiplex with the transport channel of transmission user data by the P/S converter 20, in a manner similar to the above management information.

In this instance, in a case where the scheduler management information generator 24 and the pilot generator 27 generate a time domain signal from the beginning, the IFFTs 26 and 29 are not required (the same goes for in the following).

The receiver antenna 30 receives a signal in the RF band sent from the terminal 4. The reception RF unit 31 performs predetermined wireless reception processing such as processing which frequency-converts (down-converts) the signal in the RF band received by the receiver antenna 30 into a base band signal, orthogonal detection processing which separates the reception signal into an I-Q orthogonal multiplex signal, and A/D conversion processing which converts the analogue reception signal into a digital reception signal.

The demodulator 32 demodulates the received analogue orthogonal multiplex signal obtained by the reception RF unit 31 with the modulation scheme corresponding to the modulation scheme used in the terminal 4. The feedback information evaluator 33 detects feedback information (ACK/NACK information, CQI information, or the like) sent from the terminal 4 from the demodulated data obtained by the demodulator 32. The feedback information evaluator 33 evaluates the necessity or the unnecessity of sending of retransmission information based on, for example, ACK/NACK information, and obtains information about a downlink propagation path from CQI information. This obtained information is supplied to the scheduler 12 as a scheduling determining element of the scheduler 12.

On the other hand, as shown in FIG. 5, with an attention paid to its important part, the receiver 4 according to the present embodiment includes, for example: a receiver antenna 41; a reception RF unit 42; a S/P converter 43; an FFT 44; a propagation path estimator 45; an SINR calculator 46; a CQI converter 47; a feedback information converter 48; an FFT 49; a demodulator 50; a scheduler management information evaluator 51; a demodulation evaluator 52; an S/P converter 53; an FFT 54; demodulators 55-1 through 55-k; decoders 56-1 through 56-k; a frequency aligner 57; a retransmission evaluator 58; a switch 59; a feedback information converter 60; a feedback information multiplexer 61; a modulator 62; a transmission RF unit 63; and a transmitter antenna 64.

Here, the receiver antenna 41 receives a signal in the RF band sent from the transmitter 1. The reception RF unit 42 performs predetermined wireless reception processing such as processing which frequency-converts (down-converts) the signal in the RF band received by the receiver antenna 41 into a base band signal, orthogonal detection processing which separates the reception signal into an I-Q orthogonal multiplex signal, and A/D conversion processing which converts the analogue reception signal into a digital reception signal.

The S/P converter 43 performs S/P conversion of a digital reception channel orthogonal multiplex signal obtained by the reception RF unit 42, to separate (that is, channel separation) a pilot signal (pilot channel), management information (scheduler management channel), and user data (transport channel), each of which is an I-Q orthogonal multiplex signal. The pilot signal is output to the FFT 44; the management information is output to the FFT 49; the user data is output to the demodulation evaluator 52. In this instance, in FIG. 5, a time-division multiplexed channel is separated. In such separation, the channel separation corresponding to the multiplex scheme (frequency-division multiplexing or code-division multiplexing) used on the transmitter 1 end is to be performed.

The FFT 44 performs FFT processing to the above reception pilot signal to convert the signal into a frequency domain orthogonal multiplex signal. The propagation path estimator 45 estimates a propagation path (channel) by means of correlation processing between the frequency-domain signal and a known pilot signal (pilot replica). This obtained estimation result (channel estimation value) is supplied to the SINR calculator 46 and each demodulator 50 and 55-x.

The SINR calculator 46 calculates an SINR (Signal to Interference and (pulse) Noise Ratio), that is, a signal ratio to total noise obtained by combining interference and thermal noise based on the above channel estimation value. The CQI converter 47 converts the SINR obtained by the SINR calculator 46 into CQI information which is expressed by quantizing the quality of the propagation path with specific rules in accordance with various conditions. The obtained CQI information is orthogonal multiplex with ACK/NACK information by the feedback information multiplexer 61, which will be detailed below, and is fedback from the transmitter antenna 64 to the transmitter 1 end through a propagation path.

The feedback information converter 48 converts the CQI information into a format in compliance with the transmission channel format of the feedback information.

The FFT 49 performs FFT processing to management information (orthogonal multiplex signal) separated by the S/P converter 43 to convert the information into a frequency domain orthogonal multiplexing signal. The demodulator 50 demodulates the frequency domain orthogonal multiplex signal using the channel estimation value obtained by the propagation path estimator 45 with the demodulation scheme corresponding to the modulation scheme used on the transmitter 1. In this instance, the modulation performed by the demodulator 50 is previously performed to modulation of a transport channel executed by each demodulator 55-k.

The scheduler management information evaluator 51 evaluates the presence or the absence of information data of a user in a transport channel and information required for demodulation of the transport channel (information such as an allocated sub-carrier, a modulation scheme, a coding scheme, a coding rate, or the like) based on information of a scheduler management channel (scheduler management information) demodulated by the demodulator 50.

The demodulation evaluator 52 specifies demodulation and decoding of the transport channel to the S/P converter 53 in a case where information data of the above user is included in the transport channel, based on the management information obtained by the above scheduler management information evaluator 51. The S/P converter 53 performs S/P conversion of data in the transport channel into the sub-carrier-number (=k) of parallel signals (orthogonal multiplex signal) in accordance with the specification given by the demodulation evaluator 52. The FFT 54 performs FFT processing to the parallel signals to convert them into a frequency domain orthogonal multiplex signal. In this instance, in a case where the information data of the user is not contained, it is possible to halt the demodulation processing to restrain power consumption.

The demodulator 55-x demodulates the frequency domain signal after being subjected to FFT using the channel estimation value obtained by the propagation path estimator 45 with a demodulation scheme specified by the scheduler management information obtained by the scheduler management information evaluator 51. The decoder 56-x decodes the demodulated data obtained by the corresponding demodulator 55-x with the coding scheme and the coding rate specified by the scheduler management information obtained by the scheduler management information evaluator 51.

The frequency aligner 57 arranges the decoded data obtained by the decoder 56-x into time series data in accordance with the frequency fx of the sub-carrier. The retransmission evaluator 58 performs a true-false evaluation of the data input from the frequency aligner 57 using a CRC (Cyclic Redundancy Check) bit or the like. If no error is present, it means that data has been correctly extracted, so that an ACK signal is output to the feedback information converter 60 by way of the switch 59 as information to be fedback to the transmitter 1. If any error is present, an NACK signal is output to the feedback information converter 60 by way of the switch 59 as information to be fedback to the transmitter 1.

In this instance, in a case of an ACK signal, the switch 59 is controlled to output the data to the subsequent stage as it is. Contrarily, in a case of a NACK signal, the switch 59 is controlled not to output the data. In addition, in a case of a NACK signal, if retransmission combination processing based on HARQ is performed, useful signals out of the received signals are maintained to be accumulated in a non-illustrated memory or the like until a retransmission signal is received.

The feedback information converter 60 converts the ACK/NACK signal so as to have a format in conformity with the transmission channel format of the feedback information. The feedback information multiplexer 61 multiplexes the ACK/NACK signal and the CQI information from the feedback information converter 48. The modulator 62 modulates the feedback information after being subjected to the multiplexing with a predetermined modulation scheme. In this case, also, as modulation data, an orthogonal multiplex signal of the I channel signal and the Q channel signal can be obtained.

The transmission RF unit 63 performs wireless transmission processing such as frequency conversion (up-conversion) of the modulation data into a signal in the radio frequency (RF) band to amplify the signal up to a required transmission power. The transmitter antenna 64 radiates the transmission signal in the RF band to a propagation path to the transmitter 1.

Hereinafter, a description will be made of an operation of a system (transmitter 1 and receiver 4) with the above described construction.

First of all, in the transmitter 1, the memory 10-$j$ stores transmission data stream of each user. The necessity and the unnecessity of retransmission information is acknowledged from ACK/NACK information, out of feedback information reported from the receiver 4, that is, feedback information obtained through the receiver antenna 30, the reception RF unit 31, the demodulator 32, and the feedback information evaluator 33. Such information of each user is aggregated in the scheduler 12. Further, preferential information such as the types of transmission information (real time communication such as telephone and games, and non-real time communication such as the Internet communication and download of files), discrimination of the charge classes of clients, the amount of information accumulated in a memory, an average throughput, and whether or not retransmission is to be performed, is aggregated also in the scheduler 12. The scheduler 12 determines the priority order by which transmission opportunities are practically allocated, based on the above described various kinds of information (step S1 of FIG. 8).

The scheduler 12 reads user data streams from the memory 10-$j$ to the frequency allocator 13 in accordance with the determined priority order. The frequency allocator 13 allocates each of the input data streams to any one of the sub-carriers fx. Each sub-carrier signal is coded by the corresponding coder 14-$x$ with the coding scheme and the coding rate specified by the scheduler 12 (priority allocating/AMC setting unit 23), and is then adaptively modulated by the corresponding modulator 15-$x$ also with the specified modulation scheme (step S2 of FIG. 8). In this instance, each user data stream can be adaptively modulated in the unit of a group in which more than one sub-carrier fx is collected, not in the minimum sub-carrier fx unit.

This obtained adaptive modulation signal is input to the IFFT 16 and is subjected to IFFT processing, thereby being converted into a time domain signal (step S3 in FIG. 8), and is then time-division multiplexed by the P/S converter 17 and input to the peak evaluator 18. The peak evaluator 18 performs peak evaluation of the signal (transport channel signal) from the P/S converter 17, and evaluates the presence or the absence of generation of an unallowable PAPR (step S4 in FIG. 8).

Figure 9:
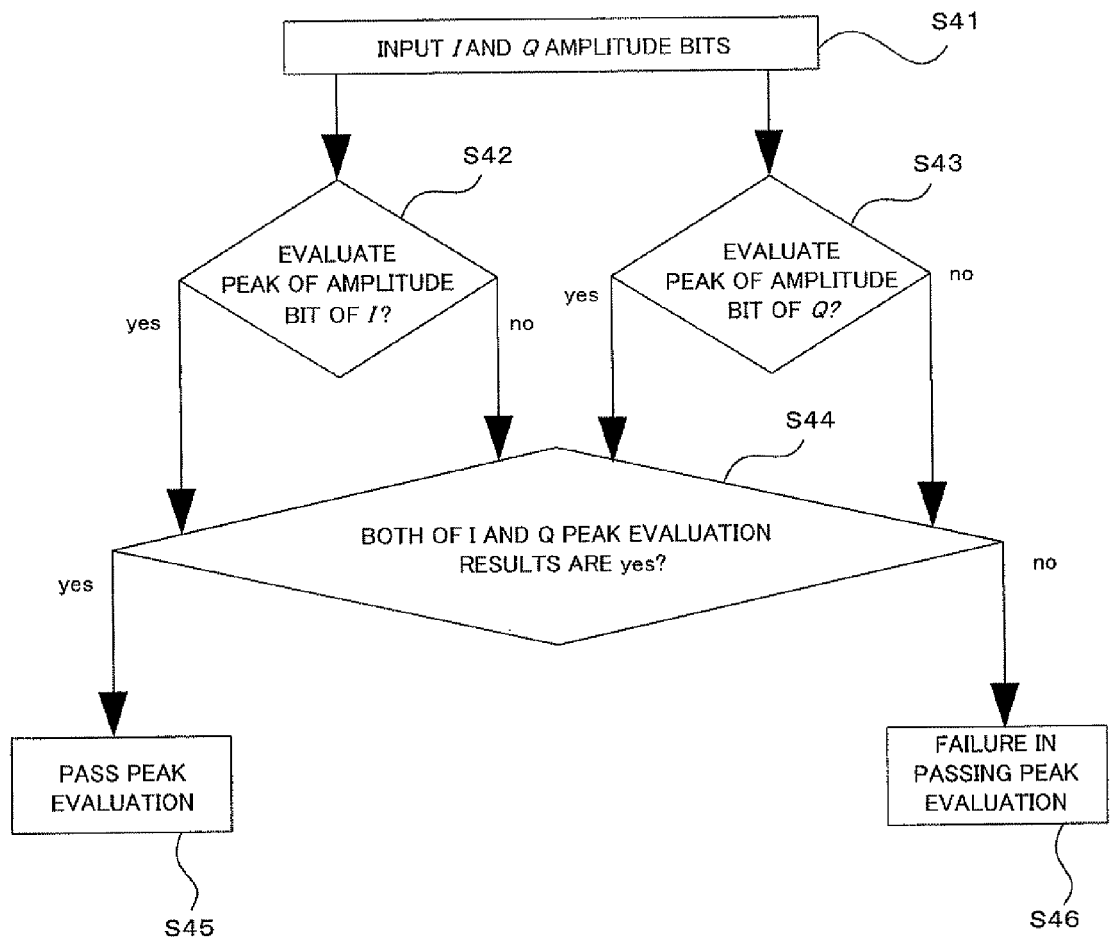
FIG. 9 is a flowchart for describing a peak evaluating method used in the transmitter shown in FIG. 4.

In the construction already described with reference to FIG. 6, as shown in FIG. 9, for example, the amplitude values on the I axis and the Q axis are monitored (steps S41, S42, and S43). If every of the monitoring results are within an allowable range (not larger than the threshold) (yes), it is decided that the signal passes the peak evaluation (OK) (from yes route of step S44 to step S45). Otherwise, it is decided that the signal does not pass the peak evaluation (NG) (from no route of step S44 to step S46).

Figure 10:
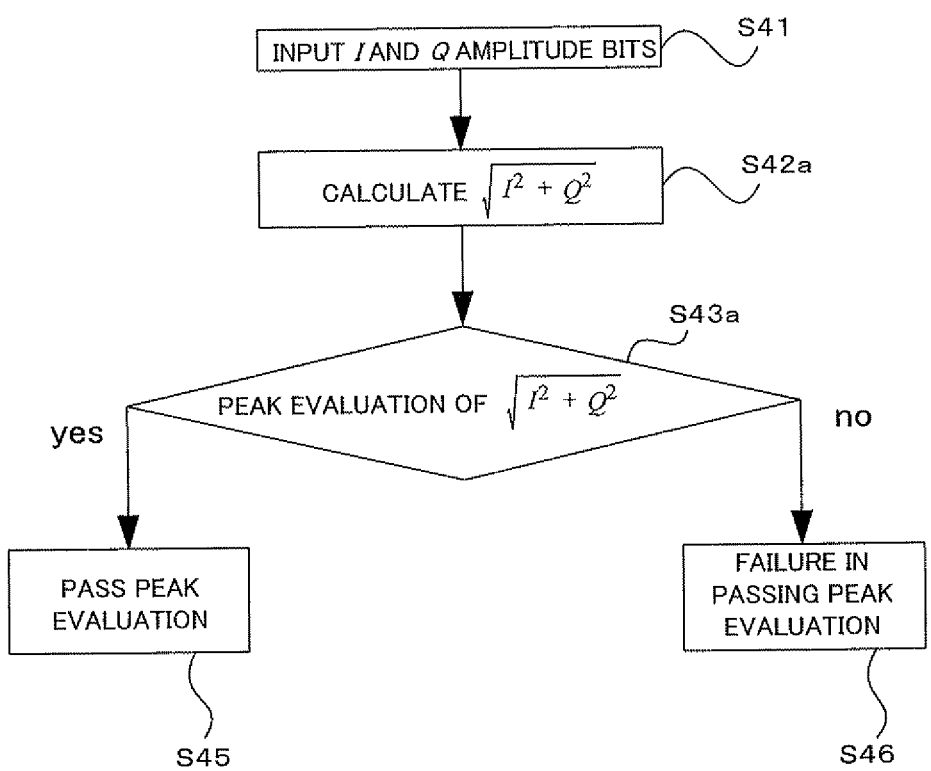
FIG. 10 is a flowchart for describing another peak evaluating method used in the transmitter shown in FIG. 4.

Alternatively, with the construction already described with reference to FIG. 7, as shown in FIG. 10, for example, the amplitude value $(I^2+Q^2)^{1/2}$ after combination with respect to the I axis and the Q axis is monitored (steps S41 and S42$a$). If the monitoring result is within an allowable range (not larger than the threshold value), it is decided that peak evaluation is passed (OK) (from yes route of step S43$a$ to step S45). Otherwise, it is decided that peak evaluation is not passed (NG) (from no route of step S43$a$ through step S46).

Figure 8:
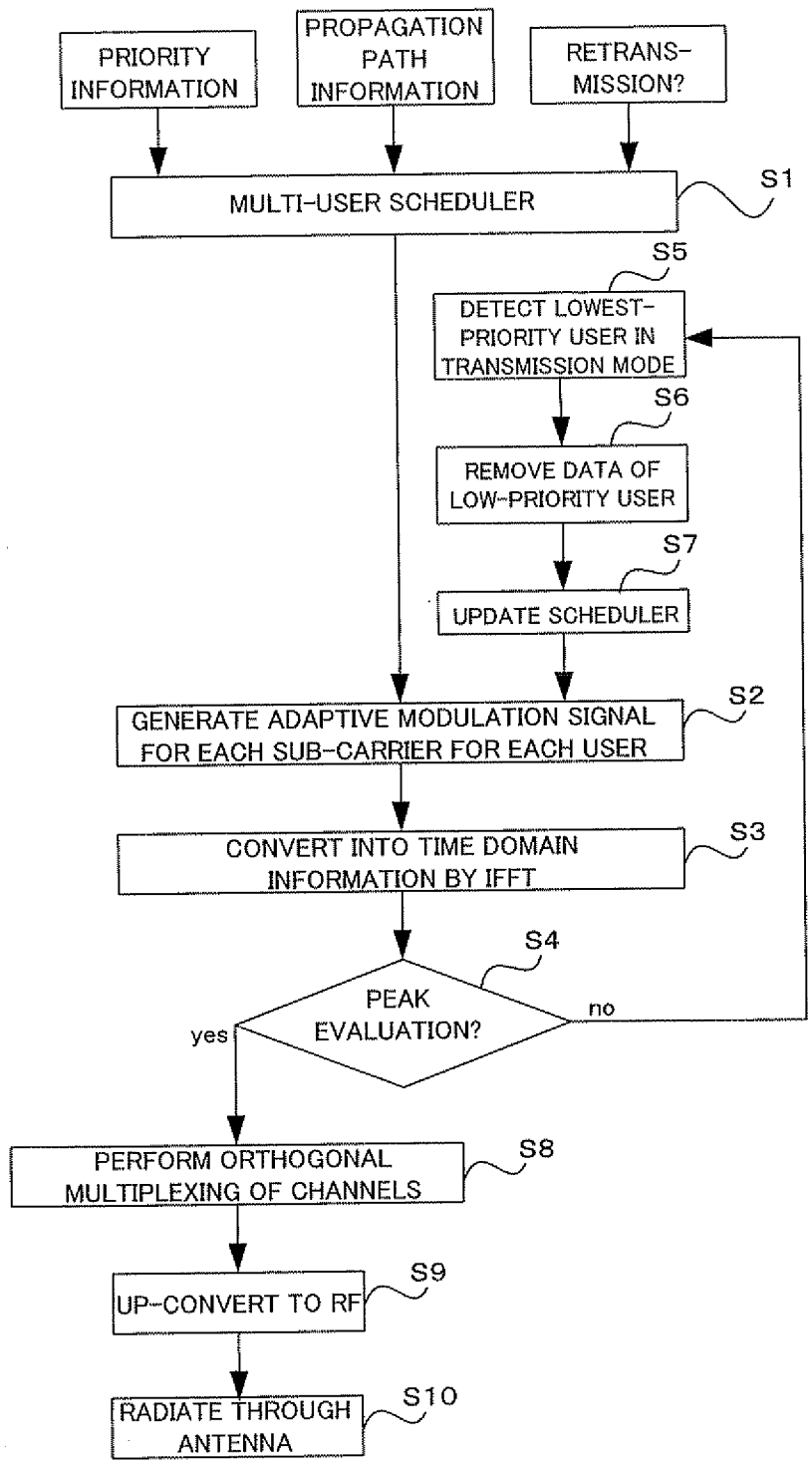
FIG. 8 is a flowchart for describing a whole operation (peak suppressing method) of the transmitter shown in FIG. 4.

If the peak evaluation result is "OK", as shown in FIG. 8, the transport channel signal is input to the P/S converter 20 by way of the switch 19, and is then orthogonal multiplexed with signals of other channels, that is, a signal of the pilot channel obtained through the pilot generator 27, the modulator 28, and the IFFT 29, and a signal of the scheduler management channel obtained through the scheduler management information generator 24, the modulator 25, and the IFFT 26 (from yes route of step S4 through step S8). After that, the multiplexed signal is converted (up-converted) to an RF signal (step S9) by the transmission RF unit 21, and is then sent out through the transmitter antenna 22 (step S10).

On the other hand, if the peak evaluation result is NG, such information is fedback to the priority allocating/AMC setting unit 23. The priority allocating/AMC setting unit 23 performs processing for reducing the number of sub-carrier signals (element signals of a multi-carrier signal), for example, detecting a user the lowest in priority and controlling the scheduler 12, the coder 14-$x$, and the modulator 15-$x$ in such a manner that the user data stream of the user the lowest in priority is halted (withheld) (steps S5, S6, and S7). In this instance, as a means for halting transmission, it is considerable that the number of sub-carriers is reduced (changed). However, it is more preferable that transmission of the user data stream of a user the lowest in priority is withheld, that is, the data is removed (in other words, puncture which replaces the amplitude value with "0" is executed) so as not to increase control information for specifying adaptive modulation.

After that, under such a state that the number of transmission user data streams is reduced, adaptive modulation is performed once again, and the processing of the above steps S2, S3, S5 through S7 is repeated, and removal of a user data stream is repeated in increasing order of user precedence until the peak evaluation result of "OK" is finally obtained by the peak evaluator 18 (until a "yes" decision is obtained in step S4).

Then, if the peak evaluation result becomes "OK", orthogonal multiplexing with other channels (signals of the pilot channel and the scheduler management channel) as described above (from yes route of step S4 through step S8) is performed, and then, the multiplexed signal is converted (up-converted) into an RF signal by the transmission RF unit 21 (step S9), which is sent out through the transmitter antenna 22 (step S10).

On the other hand, in the terminal 4, the RF signal sent from the above transmitter 1 is received by the receiver antenna 41. After being converted (down-converted) into a base band signal by the reception RF unit 42, the signal is channel-separated into each signal of the pilot channel, the scheduler management channel, the transport channel, and other channels by the S/P converter 43.

Then, the signal (pilot signal) of the pilot channel is subjected to FFT processing by the FFT 44, thereby being converted into a frequency domain signal, and is input to the propagation path estimator 45. The propagation path estimator 45 performs channel estimation processing, that is, correlation operation processing of the reception pilot signal and a pilot replica is performed, the channel estimation value being thereby obtained. Using this information, first of all, the scheduler management channel is demodulated, and subsequently, the transport channel is demodulated.

The signal of the scheduler management channel is subjected to FFT processing by the FFT 49, thereby being converted into a frequency domain signal, and is then demodulated by the demodulator 50 using the channel estimation value obtained by the propagation path estimator 45. This obtained demodulation data is input to the scheduler management information evaluator 51, and the presence or the absence of information data of a user in the transport channel and information used for demodulation of the transport channel (for example, information such as the allocated sub-carrier, the modulation scheme, the coding scheme, and the coding rate) is evaluated and obtained, and then, the information is notified to the demodulation evaluator 52, the demodulator 55-$x$, and the decoder 56-$x$.

With the above described operation, if information data to be decoded is contained in the transport channel, the demodulation evaluator 52 performs decoding specification of the transport channel. After the decoding specification is performed, the signal in the transport channel is converted into the sub-carrier-number of parallel signals by the S/P converter 53. The FFT 54 then converts the parallel signals into frequency domain signals, each of which is input to the corresponding demodulator 55-$x$. The demodulator 55-$x$ demodulates a sub-carrier signal containing information destined to the local terminal 4 using the channel estimation value obtained by the propagation path estimator 45 with the demodulation scheme corresponding to the modulation scheme notified from the scheduler management information evaluator 51.

This obtained demodulation data is decoded by the corresponding decoder 56-$x$ based on the coding scheme and the coding rate used on the transmitter 1 which are notified from the scheduler management information evaluator 51. The obtained decoded data is arranged by the frequency aligner 57 into time series data in accordance with the sub-carrier fx, and is then input to the retransmission evaluator 58.

The retransmission evaluator 58 performs an evaluation of data error input from the frequency aligner 57 using a CRC bit or the like. If no error is present, an ACK signal is generated and output. Otherwise, a NACK signal is generated and output. At that time, if re-transmission combination based on HARQ is performed, useful signals, out of the received signals, are maintained to be accumulated in a non-illustrated memory until a retransmission signal is received.

Then, after being converted by the feedback information converter 60 so as to have a format in conformity with the transmission channel format of feedback information sent to the transmitter 1, the ACK/NACK signal is multiplexed by the feedback information multiplexer 61 with CQI information obtained from the reception pilot signal through the FFT 44, the propagation path estimator 45, the SINR calculator 46, the CQI converter 47, and the feedback information converter 48.

The multiplexed signal (feedback information) is modulated with a predetermined modulation scheme by the modulator 62, and is converted into an RF signal by the transmission RF unit 63, and is then sent out from the transmitter antenna 64 toward the transmitter 1.

As described above, according to the present embodiment, in the transmitter 1, when an unallowable PAPR is generated, data removal (puncture) is sequentially performed in increasing order of the priority of user data streams (sub-carriers) in the scheduler 12 until the PAPR falls within an allowable PAPR. This cuts a part of the user data streams when PAPR suppression is required, thereby suppressing the PAPR, so that the PAPR can be suppressed with ease without increase in operation scale like in PTS transmission, SLM transmission, or the like, while communication of users high in priority (schedule order) is maintained as much as possible.

Further, in the previous art, since puncture of a sub-carrier causes a bit error, a strong error correction is required to prevent an occurrence of a packet error. In the present embodiment, however, since the presence or absence control is performed for data of each user, no impact is caused on a bit error or a packet error.

In addition, as to a user whose transmission is temporarily halted for PAPR suppression, the presence or the absence of data is notified through the scheduler management channel, so that useless operations of the demodulation processing and decoding processing circuits are eliminated. This significantly contributes to lowering of power consumption of the terminal 4.

In this instance, the above described example is a technique of improving a throughput while maintaining QoS (Quality of Service) high, in obedience to the priority order [the types of transmission information (real time communication such as telephone and games, and non-real time communication such as the Internet communication and DL of files), evaluation of charging classes of clients, and the amount of transmission data accumulated in a memory] in the scheduler 12 in scheduling for PAPR suppression, but scheduling specialized in PAPR suppression can also be performed.

Figure 11:
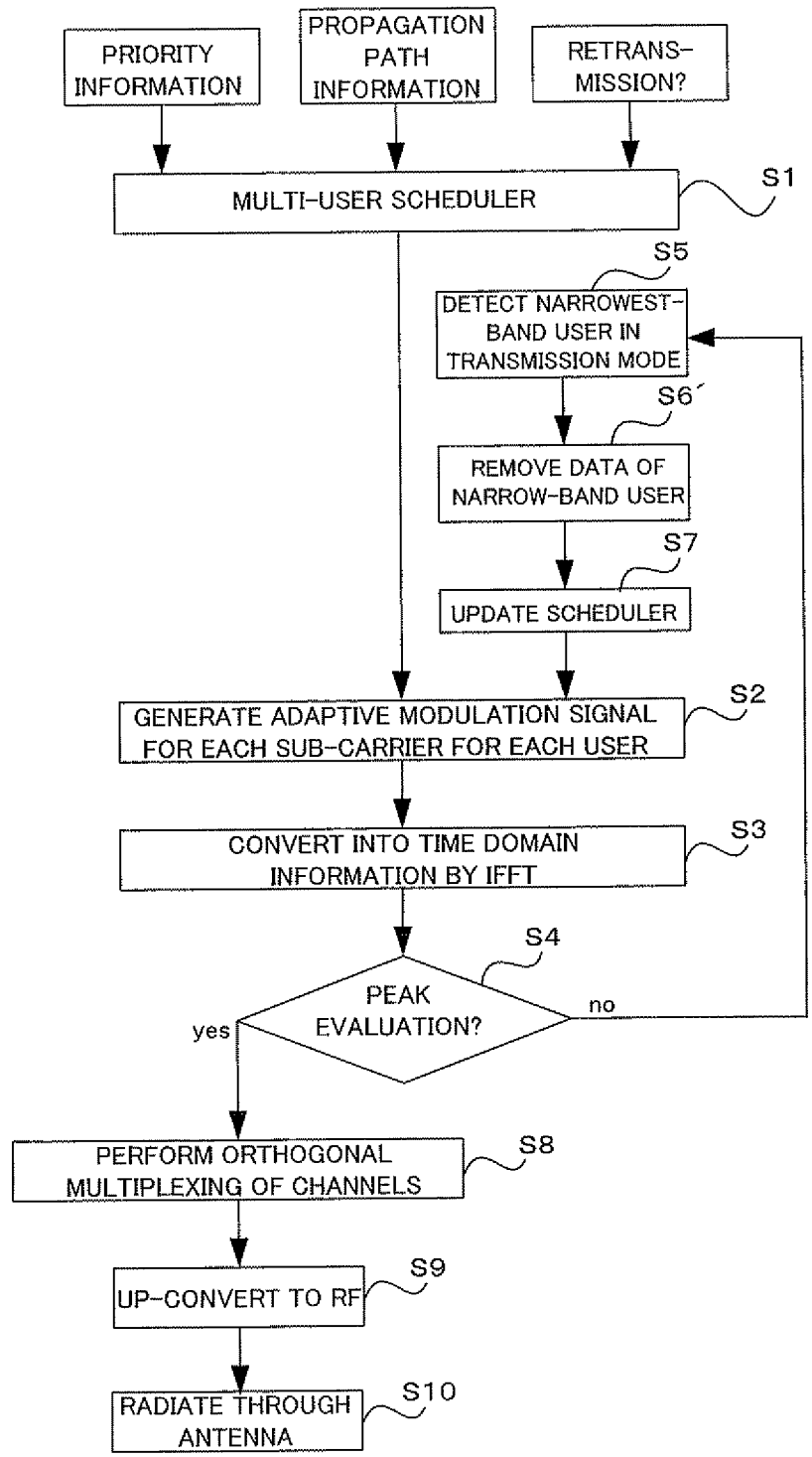
FIG. 11 is a flowchart illustrating a modified example of a whole operation (peak suppressing method) of the transmitter shown in FIG. 8.

The operation flow in that case is illustrated in FIG. 11. That is, in a case where the peak evaluation result is NG and rescheduling is required, the transmitter 1 detects a user whose frequency band in use is the narrowest and selects the user as a subject of data removal, in place of the processing in step S6 which has already been described with reference to FIG. 8 (step S6').

As resultant effects of suppressing a PAPR, the greater the frequency band of a user whose data is withheld from transmission, the greater the power contained therein can be reduced, and it is also possible to reduce the possibility for multiple sub-carriers to be coherent in phase, thereby exhibiting an amplitude emphasizing effect. However, the number of frequency bands for use becomes smaller, so that a problem of lowering of a throughput is caused. Hence, as described above, by means of sequentially selecting users as subjects of data removal thereof in increasing order of the width of a frequency band in use, it becomes possible to suppress reduction of a throughput.

a) Rescheduling of Users Whose Data Transmission is Withheld

Figure 12:
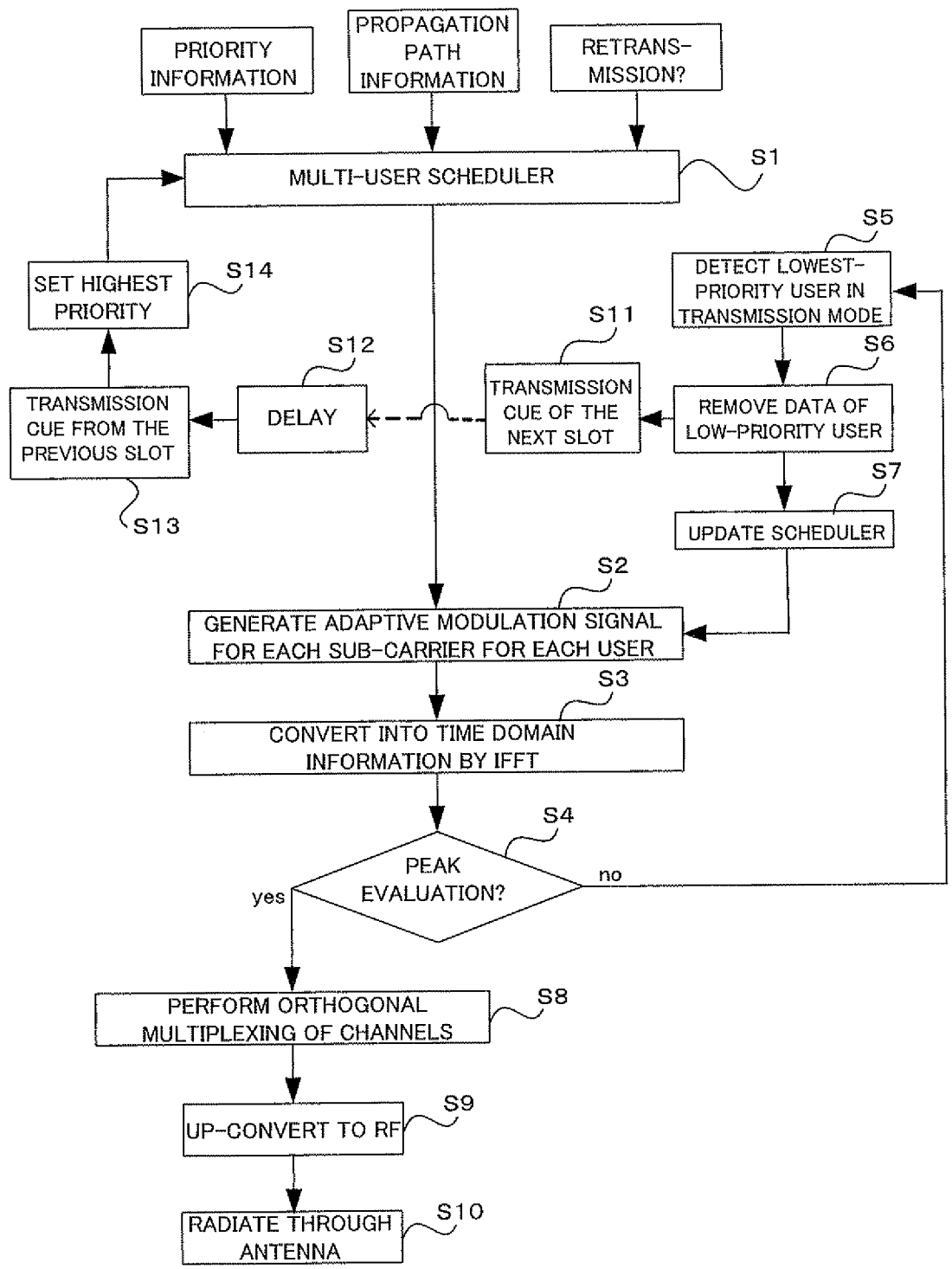
FIG. 12 is a flowchart illustrating another modified example of a whole operation (peak suppressing method) of the transmitter shown in FIG. 8.

As to a user who is set in the transmission cue but is withheld from data transmission thereof at a transmission opportunity for PAPR suppression, his/her data is made to be transmitted at the next slot (the next transmission opportunity) without fail (preferentially). That is, as shown in FIG. 12, for example, the data stream of a user low in priority whose data has been removed in step S6 (or step S6' in FIG. 11) is stored in the transmission cue of the next slot and subjected to predetermined delay processing. After that, the scheduler 12 (priority allocating/AMC setting unit 23) performs the highest priority setting (updating of the scheduling information) for the user (steps S11, S12, S13, and S14).

The above processing makes it possible to keep the fairness of transmission opportunity to each terminal 4. This is an efficient means in both of the following views: a technical background that transmission should be performed within a time duration in which the state of a propagation path notified from the terminal 4 with CQI is not significantly changed since the transmitter 1 executes adaptive modulation suitable for the propagation path state notified from the terminal 4; a service background that transmission delay should not be caused as much as possible.

[C] Second Embodiment

Figure 13:
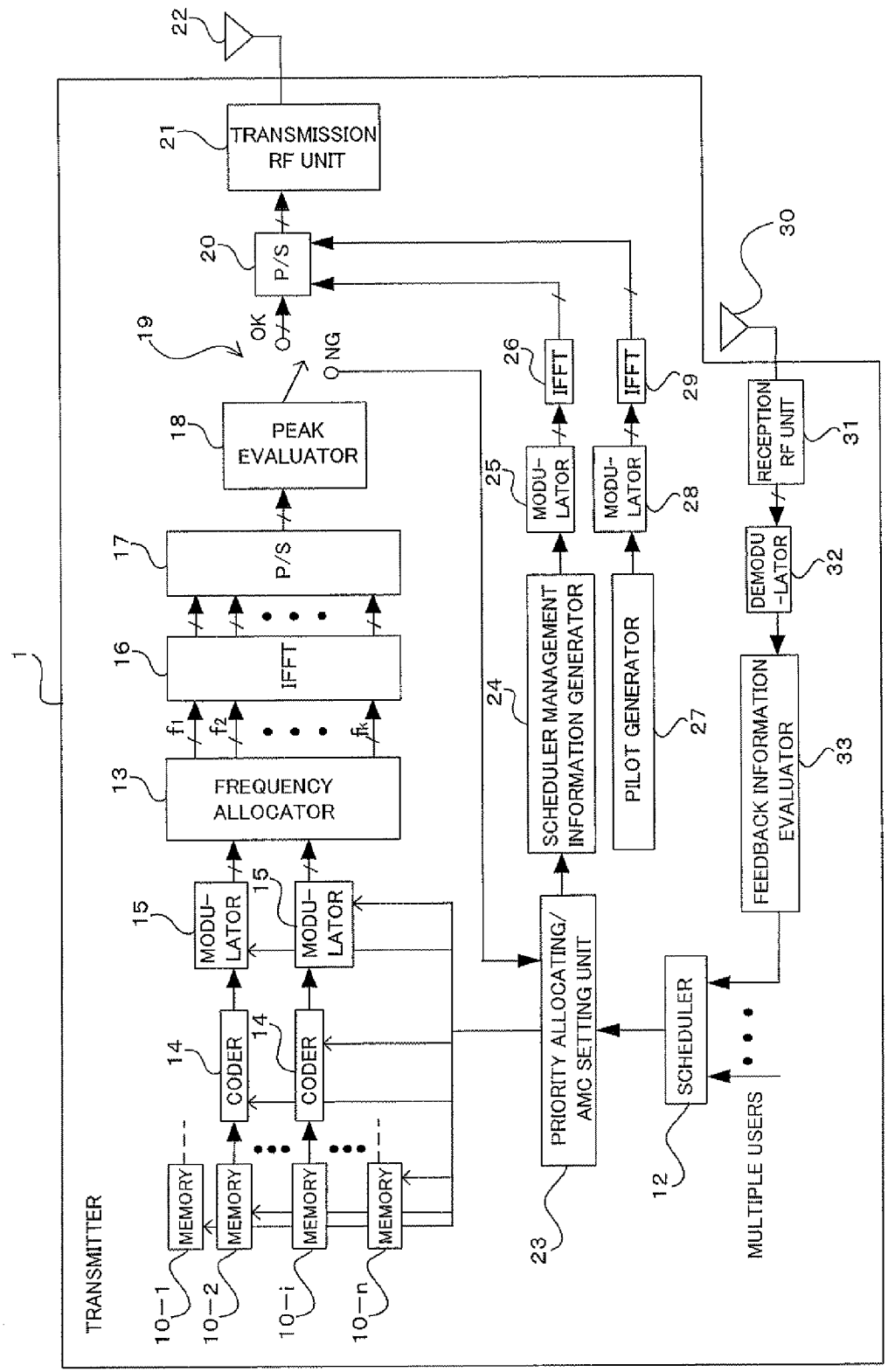
FIG. 13 is a block diagram illustrating a construction of a multicarrier (OFDM) transmission system with a focus on a transmitter (multicarrier communication apparatus) according to a second embodiment.

FIG. 13 is a block diagram illustrating the above described transmitter 1 according to a second embodiment. The construction of the transmitter 1 of FIG. 13 differs from the construction of the transmitter 1 above described with reference to FIG. 4, in that the coder 14 and the modulator 15 are provided for the previous stage to the frequency allocator 13. That is, in the construction of the present example, adaptive modulation is performed for each user, not for each sub-carrier (or each sub-carrier group) shown in FIG. 4, before user data streams are mapped to sub-carriers.

In the present example, although adaptive modulation optimal for each sub-carrier (or each sub-carrier group) is not performed, the adaptive modulation scheme can be specified for each user, so that it is possible to reduce the amount of control information.

In this instance, in FIG. 13, the construction elements added thereto with reference characters the same as those already described are the same as or similar to those added with the already described reference characters. In addition, the coder 14 and the modulator 15 are the same as or similar to the already described coder 14-$x$ and the modulator 15-$x$, respectively. The coders 14 and the modulators 15 of the number not larger than the maximum number n of users (the number of memories 10-$j$), more specifically, of the number of maximum simultaneous communications allowable, may be provided. Further, the construction of the receiver 4 need not be different from that shown in FIG. 5.

[D] Third Embodiment

Figure 14:
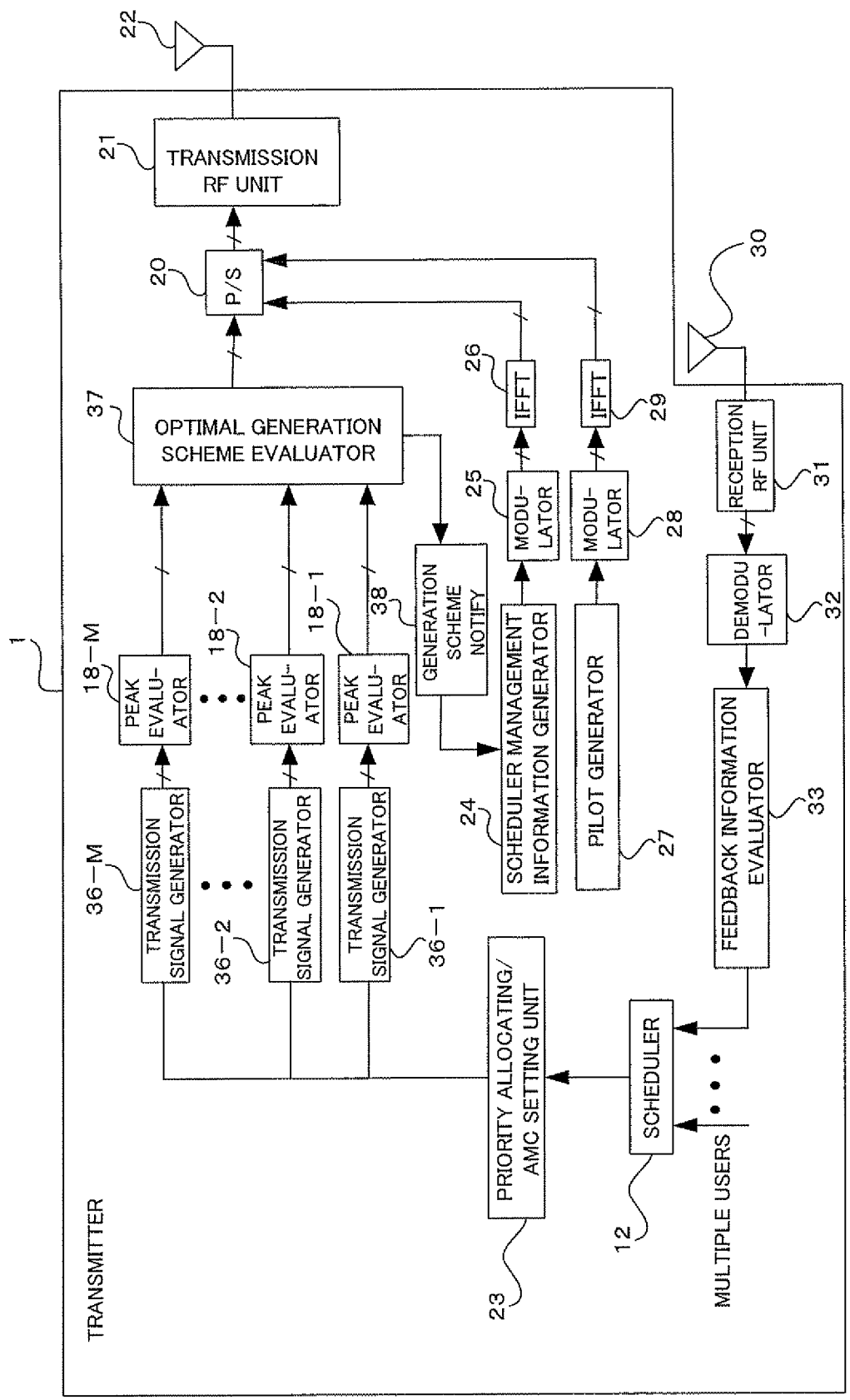
FIG. 14 is a block diagram illustrating a construction of a multicarrier (OFDM) transmission system with a focus on a transmitter (multicarrier communication apparatus) according to a third embodiment.

FIG. 14 is a block diagram illustrating a third embodiment of the above described transmitter 1. The construction of the transmitter 1 shown in FIG. 14 differs from that of the transmitter 1 shown in FIG. 4, in that the block in the stage previous to the P/S converter 20 is replaced with a block including: multiple transmission signal generators 36-1 through 36-M; the multiple peak evaluators 18-1 through 18-M corresponding to the transmission signal generators 36-1 through 36-M, respectively; an optimal generation scheme evaluator 37; and a generation scheme notifying unit 38. In this instance, the construction elements added thereto with reference characters the same as those already described are the same as or similar to those already described unless otherwise described. In addition, the construction of the terminal 4 need not be different from that of the receiver 4 in the first embodiment (FIG. 5).

Figure 15:
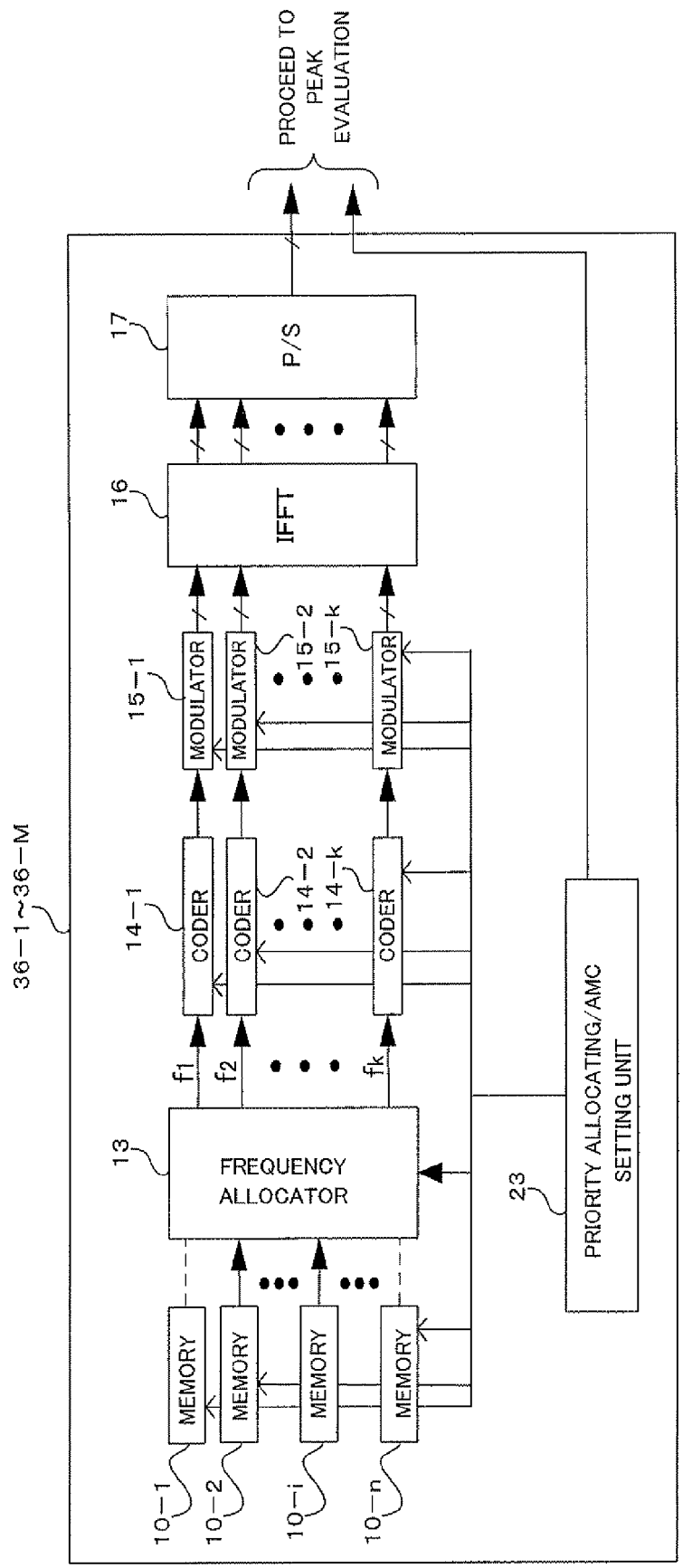
FIG. 15 is a block diagram illustrating a construction of the transmission signal generator shown in FIG. 14.
Figure 16:
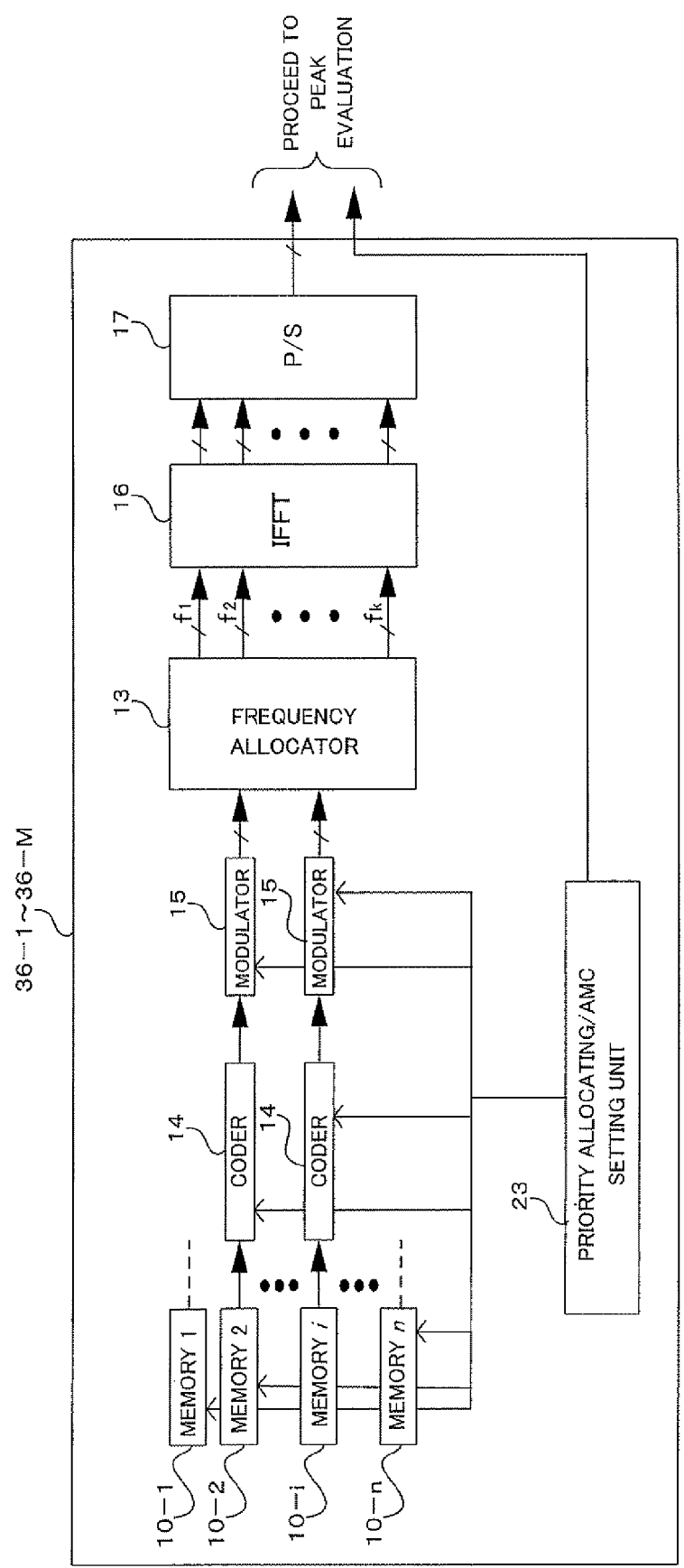
FIG. 16 is a block diagram illustrating another construction of the transmission signal generator shown in FIG. 14.

Here, as shown in FIG. 15 and FIG. 16, the transmission signal generator (multicarrier signal generating means) 36-$p$ (p=1 through M) has a construction equivalent to the previous block to the peak evaluator 18 shown in FIG. 4 or FIG. 13. Any one of the transmission signal generators 36-$p$ (for example, p=1) generates a channel orthogonal multiplex signal (multicarrier signal) for a case where data removal (exclusion) is not performed (transmission of all the sub-carries containing transmission data is performed), and the remaining transmission signal generators 36-$q$ (q≠p) is capable of generating beforehand a channel orthogonal multiplex signal in which transmission is sequentially withheld (user data stream is removed) in increasing order of the precedence of users.

That is, for example, the transmission signal generator 36-2 generates a channel orthogonal multiplex signal in which the user data stream of a user the lowest in priority (or a user whose frequency band in use is the narrowest) is removed. The transmission signal generator 36-3 generates a channel orthogonal multiplex signal in which the user data streams of two users, the lowest and the second lowest in priority (or users whose frequency bands in use are the narrowest and the second narrowest), are removed. Thereafter, in the similar manner, the remaining transmission signal generators 36-4 through 36-M generate a channel orthogonal multiplex signal in which data of users is sequentially removed in increasing order of the priority of users (or in increasing order of the width of frequency bands in use).

In this instance, in the construction illustrated in FIG. 15 and FIG. 16, AMC setting information to be notified to the scheduler management information generator 24 is output together to the subsequent stage. Further, the priority in the present example is set in the similar manner to that of the first embodiment.

Then, the peak evaluator (peak evaluating means) 18-$p$ is similar to the already described peak evaluator 18. The peak evaluator 18-$p$ performs peak evaluation of a channel orthogonal multiplex signal from the corresponding transmission signal generator 36-$p$ in the similar manner to that of the first embodiment already described. The optimal generation method evaluator (selecting means) 37 checks the peak evaluation result obtained by each peak evaluator 18-$p$, and selects a channel orthogonal multiplex signal from the transmission signal generator 36-$p$ whose peak evaluation result is "OK" (in a case where such multiple transmission signal generators 36-$p$ are present, the one in which the number of users whose data removal is performed is the minimum) as a signal obtained by the optimal generation scheme, and output the selected signal to the P/S converter 20. The selected information (containing AMC setting information) is output also to the generation scheme notifying unit.

In response to the selected information from the optimal generation method evaluator 37, the generation scheme notifying unit (notifying means) 38 notifies the scheduler management information generator 24 of information relating to the transmission signal generation scheme (a multicarrier signal selected as a subject to be transmitted), that is, information which can specify in which of the users (sub-carriers) data removal has been performed. This makes it possible to notify the terminal 4 of the information through the scheduler management channel.

In the transmitter 1 with the above described construction, the transmission signal generator 36-$p$ generates beforehand a transmission signal (channel orthogonal multiplex signal) in which data removal is not performed and a transmission signal in which data removal has been performed in increasing order of the priority of users, and the peak evaluator 18-$p$ performs peak evaluation of each of the transmission signals.

Then, the optimal generation method evaluator 37 checks each evaluation result. A transmission signal whose peak evaluation result is "OK" and in which the number of users whose data removal has been performed is the minimum is selected and output to the P/S converter 20, in which the transmission signal is multiplexed with signals of the pilot channel and the scheduler management channel. After that, the multiplexed signal is converted into an RF signal by the transmission RF unit 21 and the RF signal is sent out through the transmitter antenna 22.

In this instance, in a case where the generation scheme used by the transmission signal generator 36-*p* is set in such a manner that the number of users whose data has been removed sequentially increases from a lower number of the transmission signal generator 36-*p*, the optimal generation method evaluator 37 checks the evaluation result in increasing order of the number of the transmission signal generator 36-*p*, and selects a transmission signal from the transmission signal generator 36-*p* of the lowest number in which the peak evaluation result becomes "OK". That is, the evaluation processing in the optimal generation method evaluator 37 is simplified.

Here, the information relating to the generation scheme selected by the optimal generation method evaluator 37 is notified to the scheduler management information generator 24 by the generation scheme notifying unit 38, and a scheduler management channel containing the information is generated.

The above described embodiment realizes not only the effects and the benefits similar to those of the first embodiment and the second embodiment but also is capable of preventing performance deterioration due to latency, since the necessity of remaking a transmission signal once again after peak evaluation, like in the first and the second embodiment, is eliminated.

[E] Fourth Embodiment

Figure 17:
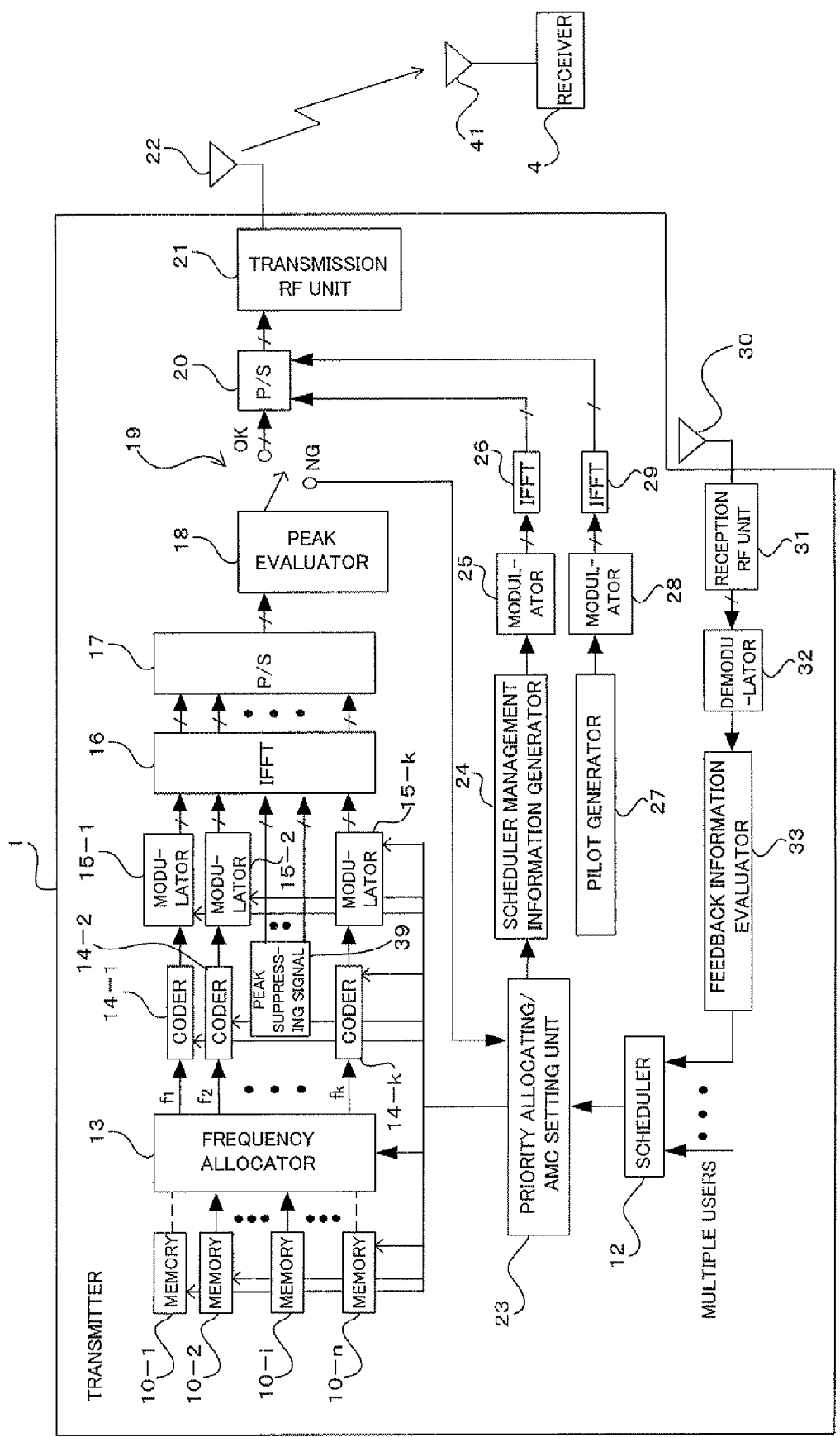
FIG. 17 is a block diagram illustrating a construction of a multicarrier (OFDM) transmission system with a focus on a transmitter (multicarrier communication apparatus) according to a fourth embodiment.
Figure 18:
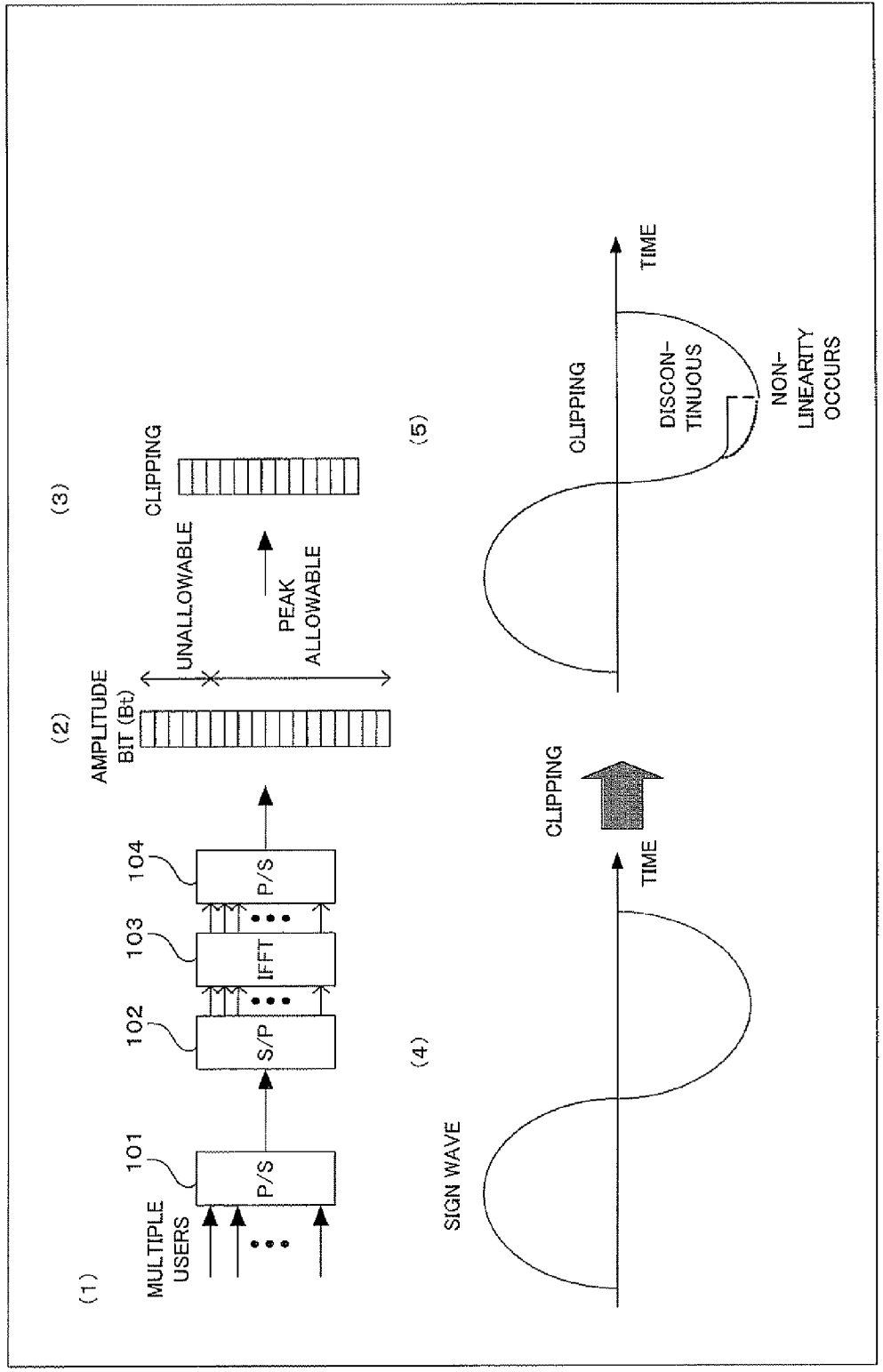
FIG. 18 is a schematic diagram for describing previous technology and its issues.

FIG. 17 is a block diagram illustrating the above described transmitter 1 according to a fourth embodiment. The construction of the transmitter 1 illustrated in FIG. 17 differs from the construction of the transmitter 1 already described with reference to FIG. 4, in that a peak suppression signal generator (peak suppressing data inserting means) 39 is provided for the previous stage to the IFFT 16. Peak suppressing data (an I-Q orthogonal multiplex signal) generated by the peak suppression signal generator 39 is input to the IFFT 16, and when the peak evaluation result is decided to be "NG" by the peak evaluator 18, the peak suppressing data can be inserted into the sub-carrier band of a user whose data transmission has been withheld in place of his/her user data stream.

Here, as the generation scheme of a peak suppressing signal, a previous known scheme, such as changing the phase of a sub-carrier to suppress its peak, can be used. This makes it possible to obtain a large peak suppressing effect in comparison with the first through the third embodiment. In this instance, such peak suppressing signal insertion can be applied also to the second and the third embodiment.

Further, the present invention should by no means be limited to the above-illustrated embodiment, and various changes or modifications may be suggested without departing from the gist of the invention.

INDUSTRIAL APPLICABILITY

As detailed above, according to the present invention, in a case where an unallowable (exceeding the threshold value) peak is generated in a multicarrier signal to be transmitted, transmission halt processing of at least some of the series of transmission data is performed (for example, transmission halt processing is sequentially performed in increasing order of the priority in the scheduling means or of the width of the frequency band used for the individual series of the transmission data until the above peak takes an allowable value). Thus, it becomes possible to accomplish peak suppression with ease without increasing the scale of the arithmetic operation like in the previous technique, while maintaining communication of users high in schedule order as much as possible. Accordingly, the present invention is considered to be extremely useful in the field of wireless communication technology.

What is claimed is:

1. A multicarrier communication apparatus which transmits a multicarrier signal including a plurality of carriers to which transmission data of a plurality of users are allocated, the multicarrier communication apparatus comprising:
   a scheduler that schedules transmission opportunities of the transmission data of the plurality of users in accordance with predetermined scheduling information;
   an evaluator that evaluates whether or not the peak of the multicarrier signal exceeds a predetermined threshold value; and
   a suppressor that halts transmission of at least some of the transmission data of the plurality of users by a user unit based on the scheduling information upon decision by said evaluator that the result of the evaluation exceeds the threshold value, wherein said suppressor performs the halt processing repeatedly to the transmission data in order of increasing of the width of the frequency band used for the individual transmission data, based on frequency band information in use as element information of the scheduling information, until said evaluator decides that the peak does not exceed the threshold value.

2. The multicarrier communication apparatus as set forth in claim 1, further comprising:
   a notifier that notifies an apparatus which receives the multicarrier signal of information identifying transmission data having been subjected to the halt processing.

3. The multicarrier communication apparatus as set forth in claim 1, further comprising:
   a peak suppressing data inserting unit that inserts peak suppressing data in place of the transmission data having been subjected to the halt processing.

4. The multicarrier communication apparatus as set forth in claim 1, wherein said scheduler includes an updater that updates the scheduling information in order to set the transmission data having been subjected to the halt processing in such a manner that said transmission data is to be preferentially transmitted at the next transmission opportunity.

5. A multicarrier communication apparatus which transmits a multicarrier signal including a plurality of carriers to which transmission data of a plurality of users are allocated, the multicarrier communication apparatus comprising:
   a scheduler that schedules transmission opportunities of the transmission data of the plurality of users in accordance with predetermined scheduling information;
   a generator that generates the multicarrier signal and one or more multicarrier signals, from which at least some of the transmission data of the plurality of users have been removed by a user unit beforehand based on the scheduling information;
   an evaluator that evaluates whether or not the peak of said each multicarrier signal generated by said generator exceeds a predetermined threshold value; and
   a selector that selects a multicarrier signal whose peak is decided not to exceed the threshold value by said evaluator as a subject to be transmitted, wherein said generator generates said one or more multicarrier signals, in which transmission data has been removed beforehand out of the series of the transmission data whose frequency band is narrower than the others, based on frequency band information in use as element information of the scheduling information.

6. The multicarrier communication apparatus as set forth in claim 5, further comprising: a peak suppressing data inserting unit that inserts peak suppression data in place of the transmission data which has been removed beforehand.

7. The multicarrier communication apparatus as set forth in claim 5, further comprising: a notifier that notifies an apparatus which receives the multicarrier signal of information relating to a multicarrier signal selected by said selector.

8. The multicarrier communication apparatus as set forth in claim 5, wherein said scheduler includes an updater that updates the scheduling information in order to set the transmission data which has been removed beforehand from element data of a multicarrier signal selected by said selector in such a manner that said transmission data is to be preferentially transmitted at the next transmission opportunity.

\* \* \* \* \*